(12) United States Patent
Leng

(10) Patent No.: US 11,754,224 B2
(45) Date of Patent: Sep. 12, 2023

(54) SINGLE-LAYER PLASTIC COMPOSITE BOARD

(71) Applicant: NEW-TEC INTEGRATION (XIAMEN) CO., LTD., Fujian (CN)

(72) Inventor: Luhao Leng, Fujian (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 658 days.

(21) Appl. No.: 16/643,495

(22) PCT Filed: Aug. 27, 2018

(86) PCT No.: PCT/CN2018/102462
§ 371 (c)(1),
(2) Date: Feb. 28, 2020

(87) PCT Pub. No.: WO2019/042241
PCT Pub. Date: Mar. 7, 2019

(65) Prior Publication Data
US 2020/0191331 A1    Jun. 18, 2020

(30) Foreign Application Priority Data

Aug. 30, 2017 (CN) .......................... 201710763202.5
Apr. 3, 2018 (CN) .......................... 201820465365.5
(Continued)

(51) Int. Cl.
*F16S 1/10* (2006.01)
*B65D 43/16* (2006.01)
(Continued)

(52) U.S. Cl.
CPC .............. *F16S 1/10* (2013.01); *B65D 43/165* (2013.01); *B65D 43/22* (2013.01); *F16S 1/02* (2013.01);
(Continued)

(58) Field of Classification Search
CPC ....... F16S 1/10; F16S 1/02; F16S 1/06; B65D 43/165; B65D 43/22; B65D 11/18;
(Continued)

(56) References Cited

U.S. PATENT DOCUMENTS 1,485,954 A    3/1924   Brasch
2,664,596 A *  1/1954   Greig .................. A47B 96/205
                                              428/73
(Continued)

FOREIGN PATENT DOCUMENTS

CN        2517302 Y    10/2002
CN        2659227 Y    12/2004
(Continued)

OTHER PUBLICATIONS

WIPO, International Search Report and Written Opinion for International Patent Application No. PCT/CN2018/102462 with English translation, dated Nov. 21, 2018. 13 pages.
(Continued)

*Primary Examiner* — Terrell L McKinnon
*Assistant Examiner* — Michael McDuffie
(74) *Attorney, Agent, or Firm* — Perkins Coie LLP

(57) ABSTRACT

A single-layer plastic composite board (20; 30; 40) is disclosed. The single-layer plastic composite board is a two-piece single-layer plastic composite board comprising a single-layer plastic sheet (11; 21) and a stiffener (22; 32), wherein the single-layer plastic sheet (11; 21) has a main body portion (111; 211) and a peripheral portion located around the main body portion; the peripheral portion bends towards the back of the main body portion in a direction perpendicular to the main body portion to form a bent portion (112; 212); and the stiffener (22; 32) is engaged with and fixed to the bent portion (112; 212) of the single-layer plastic sheet (11; 21). The single-layer plastic composite
(Continued)

US 11,754,224 B2
Page 2 board has advantages such as a simple structure, small thickness, light weight, high strength, low cost and ease of manufacturing, and can be widely used as a cabinet board, a box board, a table board, a drawer board, a seat board and a backrest of a chair, etc.

20 Claims, 36 Drawing Sheets

(30) Foreign Application Priority Data

| Apr. 3, 2018 | (CN) | 201820466837.9 |
|---|---|---|
| Apr. 3, 2018 | (CN) | 201820466880.5 |
| Apr. 3, 2018 | (CN) | 201820467034.5 |
| Apr. 3, 2018 | (CN) | 201820472588.4 |
| Apr. 3, 2018 | (CN) | 201820480545.0 |

(51) Int. Cl.
| B65D 43/22 | (2006.01) |
|---|---|
| F16S 1/02 | (2006.01) |
| F16S 1/06 | (2006.01) |
| A47B 96/20 | (2006.01) |
| A47B 13/08 | (2006.01) |

(52) U.S. Cl.
CPC ............. *F16S 1/06* (2013.01); *A47B 13/08* (2013.01); *A47B 96/20* (2013.01); *A47B 2220/0052* (2013.01)

(58) Field of Classification Search
CPC ...... B65D 11/1873; B65D 2543/00231; A47B 13/08; A47B 96/20; A47B 2220/0052
See application file for complete search history.

(56) References Cited

U.S. PATENT DOCUMENTS

| 3,374,915 | A |   | 3/1968  | Verhein et al. |             |
|-----------|---|---|---------|----------------|-------------|
| 3,655,087 | A | * | 4/1972  | Luisada        | B65D 11/1873 |
|           |   |   |         |                | 220/4.28    |
| 3,700,134 | A | * | 10/1972 | Blanchard      | B65D 88/528 |
|           |   |   |         |                | 217/65      |
| 3,906,127 | A | * | 9/1975  | Hollmann       | B32B 27/10  |
|           |   |   |         |                | 428/116     |
| 4,196,948 | A | * | 4/1980  | Gavel          | A47B 96/201 |
|           |   |   |         |                | 312/107     |
| 4,696,412 | A |   | 9/1987  | McGowan et al. |             |
| 4,931,340 | A | * | 6/1990  | Baba           | B32B 27/08  |
|           |   |   |         |                | 108/51.11   |
| 4,991,717 | A | * | 2/1991  | May            | B65D 43/0206 |
|           |   |   |         |                | 220/255     |
| 5,092,093 | A |   | 3/1992  | Lu             |             |
| 5,152,591 | A |   | 10/1992 | Beals          |             |
| 5,348,384 | A | * | 9/1994  | Hull           | A47B 13/08  |
|           |   |   |         |                | 52/287.1    |
| 5,551,352 | A | * | 9/1996  | Meier          | A47B 13/083 |
|           |   |   |         |                | 108/27      |
| 5,638,973 | A | * | 6/1997  | Dewey          | B65D 11/1873 |
|           |   |   |         |                | 206/509     |
| 5,732,637 | A | * | 3/1998  | Raab           | A47B 13/083 |
|           |   |   |         |                | 52/789.1    |
| 5,868,081 | A |   | 2/1999  | Raab           |             |
| 5,947,037 | A | * | 9/1999  | Hornberger     | A47B 13/02  |
|           |   |   |         |                | 108/115     |
| 6,058,853 | A |   | 5/2000  | Pinch          |             |
| 6,343,454 | B1 |  | 2/2002  | Fisher         |             |
| 6,966,449 | B2 | * | 11/2005 | Williams       | B65D 19/18  |
|           |   |   |         |                | 206/509     |
| 7,028,859 | B2 | * | 4/2006  | Moon           | B65D 11/1873 |
|           |   |   |         |                | 297/118     |
| 8,181,579 | B2 | * | 5/2012  | Leng           | A47B 13/003 |
|           |   |   |         |                | 108/27      |
| 8,499,954 | B2 |  | 8/2013  | Tang           |             |
| 8,534,029 | B2 | * | 9/2013  | Leng           | A47B 96/205 |
|           |   |   |         |                | 52/796.11   |
| 9,808,081 | B2 |  | 11/2017 | Leng           |             |
| 10,092,091 | B1 | * | 10/2018 | Wang         | A47B 13/02  |
| 10,427,831 | B2 | * | 10/2019 | Jiang        | B65D 25/2897 |
| 10,932,560 | B2 |  | 3/2021  | Leng           |             |
| 11,140,986 | B2 | * | 10/2021 | Leng         | F16B 5/0004 |
| 11,421,823 | B2 | * | 8/2022  | Leng         | F16S 1/10   |
| 2003/0230042 | A1 |  | 12/2003 | Rhodebeck et al. |       |
| 2008/0157571 | A1 |  | 7/2008  | Richardson   |             |
| 2008/0295454 | A1 |  | 12/2008 | Leng         |             |
| 2009/0114645 | A1 | * | 5/2009  | Zemer        | B65D 11/1873 |
|           |   |   |         |                | 220/6       |
| 2009/0117318 | A1 | * | 5/2009  | Leng         | A47B 13/003 |
|           |   |   |         |                | 428/73      |
| 2009/0324872 | A1 |  | 12/2009 | Leng         |             |
| 2010/0043681 | A1 |  | 2/2010  | Leng         |             |
| 2010/0108669 | A1 |  | 5/2010  | Yang         |             |
| 2010/0187892 | A1 | * | 7/2010  | Leng         | B32B 3/06   |
|           |   |   |         |                | 156/92      |
| 2010/0310811 | A1 |  | 12/2010 | Leng         |             |
| 2012/0117910 | A1 |  | 5/2012  | Chuang       |             |
| 2014/0197168 | A1 |  | 7/2014  | Miller et al. |            |
| 2014/0319131 | A1 |  | 10/2014 | Rees et al.  |             |
| 2016/0272363 | A1 |  | 9/2016  | Matsuoka     |             |
| 2017/0225864 | A1 |  | 8/2017  | Kinskey      |             |
| 2019/0021484 | A1 |  | 1/2019  | Leng         |             |
| 2019/0193340 | A1 |  | 6/2019  | Leng         |             |
| 2019/0313826 | A1 | * | 10/2019 | Bickford     | B65D 15/22  |
| 2020/0385167 | A1 |  | 12/2020 | Ahmed        |             |

FOREIGN PATENT DOCUMENTS

| CN | 1579889 A       | 2/2005  |
|----|-----------------|---------|
| CN | 2838945 Y       | 11/2006 |
| CN | 201099397 Y     | 8/2008  |
| CN | 101520125 A     | 9/2009  |
| CN | 201761705 U     | 3/2011  |
| CN | 102987226 A     | 3/2013  |
| CN | 102987726 A     | 3/2013  |
| CN | 103213729 A     | 7/2013  |
| CN | 103263146 A     | 8/2013  |
| CN | 103284471 A     | 9/2013  |
| CN | 103625725 A     | 3/2014  |
| CN | 204021406 U     | 12/2014 |
| CN | 204280164 U     | 4/2015  |
| CN | 106617681 A     | 5/2017  |
| FR | 429197 A        | 9/1911  |
| FR | 2918858 B3      | 7/2009  |
| FR | 2993540 A1      | 1/2014  |
| GB | 2045339 A       | 10/2018 |
| JP | H7-36767 U      | 7/1995  |
| JP | 2011514259 A    | 5/2011  |
| JP | 2013014378 A    | 1/2013  |
| WO | 2016004342 A1   | 1/2016  |
| WO | 2017045579 A1   | 3/2017  |

OTHER PUBLICATIONS

Extended European Search Report for European Application No. 21177901.2; dated Mar. 18, 2022; 5 pages.
Supplementary European Search Report for European Application No. 19782376.8; dated Jan. 19, 2022; 10 pages.
Extended European Search Report for European Application No. 19782376.8; dated Aug. 24, 2022; 10 pages.
Notice of Reasons for Refusal for Japanese Appl. No. 2020-533335 with English translation; dated Aug. 24, 2022; 6 pages.
European Patent Office, Extended European Search Report for Application No. 18850298.3 dated Jul. 2, 2021, 24 pages.
Extended European Search Report for Application No. 16845693.7 dated Feb. 21, 2019, 6 pages.
Extended European Search Report dated Apr. 9, 2021 for Application No. 18851767.6, 7 pages.

(56) References Cited

OTHER PUBLICATIONS

Notice of Reasons for Refusal for Japanese Appl. No. 2020-533335 with English translation; dated Jan. 10, 2023; 10 pages.
Notice of Reasons for Refusal for Japanese Appl. No. 2020-533336 with English translation; dated Jan. 10, 2023; 8 pages.

* cited by examiner

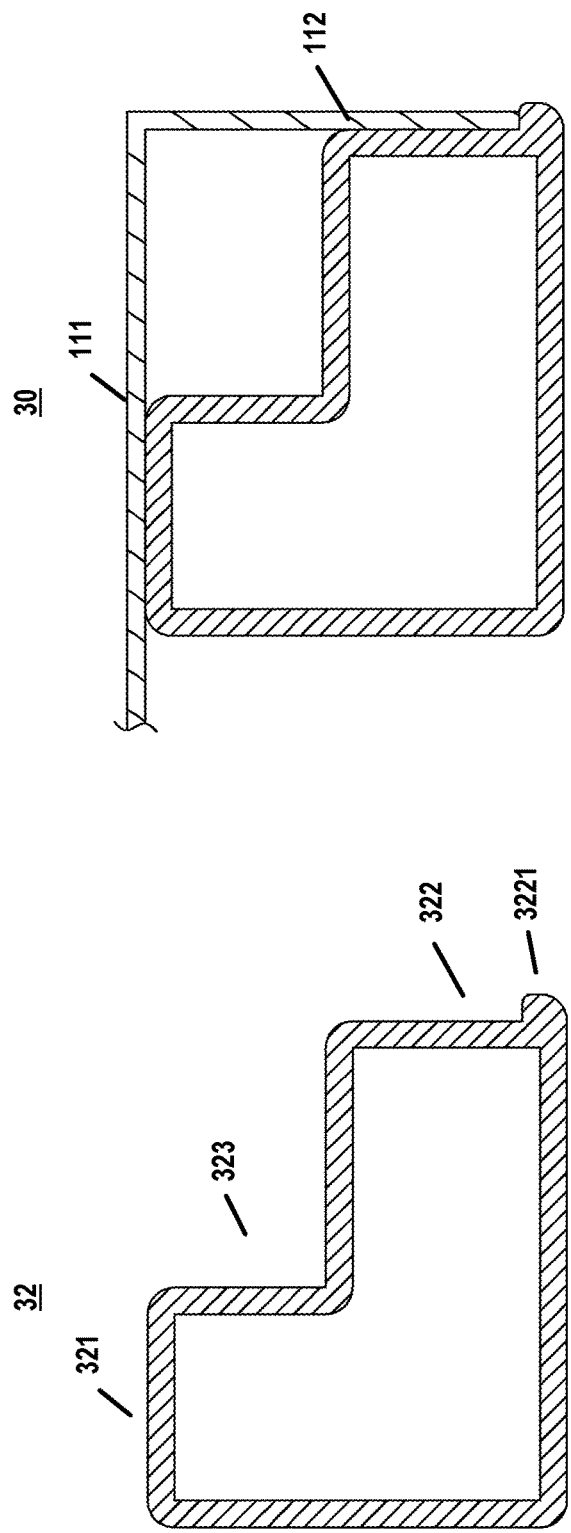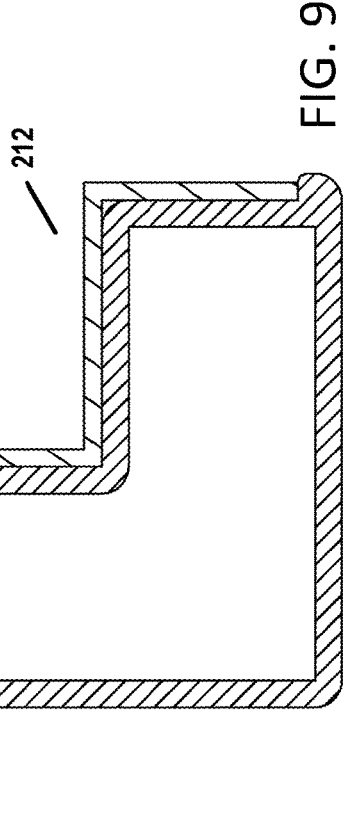

SINGLE-LAYER PLASTIC COMPOSITE BOARD

FIELD

The present disclosure generally relates to plastic boards for manufacturing articles of daily use such as furniture, and more specifically, to single-layer plastic composite boards.

BACKGROUND

As common materials in the construction industry and furniture manufacturing, boards may be used to manufacture, for example, table panels, seat boards and backrests of chairs, panels or horizontal and vertical partitions for shelves or cabinets, drawer boards, or the like. Most of the sheets used are wooden boards, such as solid wood boards, fiberboards, particle boards, and the like, at the cost of large quantities of wood. Nowadays, with the reduction of the forest resources and more attentions paid to environment protection, plastic boards are used more frequently to substitute for the wooden boards. The plastic boards have advantages of cleaning convenience, low cost, pleasant appearances, and the like.

The current plastic boards are mainly of two types. One type is single-layer plastic boards which are typically thick and heavy for maintaining the strength. The other type is multi-layer composite plastic boards, where a stiffener is embedded between the plastic face panel and the plastic base panel to increase the strength, bringing about a complicated processing technology and high production cost.

SUMMARY

In order to solve the problems in the prior art, the present disclosure provides a single-layer plastic composite board.

According to an embodiment of the present disclosure, the single-layer plastic composite board is a two-piece single-layer plastic composite board comprising a single-layer plastic sheet and a stiffener, wherein the single-layer plastic sheet includes: a planar-shaped main body portion including a front surface and a rear surface opposite to the front surface, and a peripheral portion located at a periphery of the main body portion, wherein said peripheral portion is bent along a direction perpendicular to the main body portion towards the rear surface of the main body portion to form a bent portion; and a stiffener which is engaged with and fixed to at least a part of the bent portion. In addition, the stiffener is a tubular member with a cross section having a closed shape formed by extruding formation, and when observed from the cross section, the stiffener comprises a first section in parallel with the main body portion, and a second section perpendicular to the first section, wherein the second section is, at an end far away from the first section, formed with a flange extending along a direction perpendicular to the second section towards an outside of the stiffener, and the second section is abut against the bent portion such that the flange is engaged with an end of the bent portion.

According to an embodiment of the present disclosure, the first section and the second section are adjacent to each other.

According to an embodiment of the present disclosure, the stiffener further comprises a third section located between the first section and the second section and recessed towards the inside of the stiffener, such that the first section, the second section and the third section jointly form a stepped shape.

According to an embodiment of the present disclosure, the bent portion of the single-layer plastic sheet is of a stepped shape which matches a shape formed by the second section and the third section of the stiffener.

According to an embodiment of the present disclosure, the first section abuts against the main body portion of the single plastic sheet.

According to an embodiment of the present disclosure, the stiffener is a plastic stiffener or metal stiffener.

According to an embodiment of the present disclosure, the stiffener is configured with an integral frame structure which is formed to adapt to a peripheral shape of the single-layer plastic sheet, or is configured with a split joint structure formed by a plurality of bar-type components which is adapted to the single-layer plastic sheet.

According to an embodiment of the present disclosure, the stiffener and the single-layer plastic sheet are fixed to each other via an adhesive, such as glue and the like, or by ultrasonic welding.

According to an embodiment of the present disclosure, the single-layer plastic composite board is a two-piece single-layer plastic composite board comprising a single-layer plastic sheet and a stiffener, wherein the single-layer plastic composite board includes: a planar-shaped main body portion including a front surface and a rear surface opposite to the front surface, and a peripheral portion located at a periphery of the main body portion, wherein said peripheral portion is bent along a direction perpendicular to the main body portion towards the rear surface of the main body portion to form a bent portion; and a metal stiffener that receives at least a part of the bent portion and is fixed thereto. Moreover, the metal stiffener is formed by bending or rolling a sheet-like metal sheet, and when observed from a cross section of the metal stiffener, the metal stiffener comprises a first section of a double-layer structure and a second section, wherein a length of an outer layer of the first section is greater than a length of an inner layer of the first section, and an end portion of the outer layer of the first section is bent to be in parallel with the second section and extending partial length of the second section along an outside of the second section, thereby forming, between the end portion and the second section, a gap adapted to closely receive at least a part of the bent portion.

According to an embodiment of the present disclosure, the metal stiffener further comprises a third section that extends from an end of the second section along a direction perpendicular to the second section towards an inner side of the second section and abuts against the main body portion.

According to an embodiment of the present disclosure, the metal stiffener is configured with an integral frame structure which is formed to adapt to a peripheral shape of the single plastic sheet, or is configured with a split joint structure of a plurality of bar-type components which is adapted to the peripheral shape of the single-layer plastic sheet.

According to an embodiment of the present disclosure, the metal stiffener and the single-layer plastic sheet are fixed to each other via an adhesive, such as glue and the like.

According to an embodiment of the present disclosure, the front surface of the main body portion has a pattern formed by printing.

According to an embodiment of the present disclosure, the main body portion of the single-layer plastic sheet is formed with a concave-convex configuration.

According to an embodiment of the present disclosure, the concave-convex configuration is grid-like concave-convex configuration that can reinforce strength of the single-layer plastic sheet.

According to an embodiment of the present disclosure, the single-layer plastic sheet is formed thereon with a grasp feature of an ergonomic design.

According to an embodiment of the present disclosure, a flange of the stiffener at its lower side is disposed with a wing extending downwards therefrom.

The present disclosure further provides a box, comprising a box body consisting of a front side panel, a rear side panel, a left side panel, a right side panel and a floor panel, wherein at least one of the side panels is formed of the single-layer plastic composite board according to the above embodiments.

According to an embodiment of the present disclosure, the box comprises:

support platforms respectively formed by bottom stiffeners of the front side panel, the rear side panel, the left side panel and the right side panel;

positioning edges respectively formed by a peripheral portion of the floor panel extending horizontally outwards and respectively located on the support platforms of the respective side panels; and floor panel fixing members configured to pass through fixing holes formed in the positioning edges and corresponding mounting holes formed in the support platforms, to fix the positioning edges onto the support platforms.

According to an embodiment of the present disclosure, adjacent side panels are provided with a limit post and a limit hole, respectively, wherein the limit post is configured to snap into the limit hole, so that the adjacent side panels are able to connect with each other detachably.

According to an embodiment of the present disclosure, the left side panel and the right side panel are located between the front side panel and the rear side panel, and respective sides of the left side panel and the right side panel are provided with limit posts, and inner sides of the front side panel and the rear side panel are provided with limit holes flared from top to bottom at respective positions.

According to an embodiment of the present disclosure, a middle portion of the floor panel is recessed downwards relative to the positioning edges.

According to an embodiment of the present disclosure, the middle portion of the floor panel is formed with a plurality of recessed portions arranged regularly.

According to an embodiment of the present disclosure, the floor panel fixing members are formed of plastic.

According to an embodiment of the present disclosure, the box further comprises a box lid openable from a top of the box body, wherein a rear portion of the box lid is pivotably connected to the rear side panel of the box body, and the box lid is formed from the single-layer plastic composite board according to the above embodiments.

According to an embodiment of the present disclosure, the box lid is pivotably connected to the rear side panel via a detachable hinge assembly, the hinge assembly comprising:

a first hinge member fixed to a bottom of a rear stiffener of the box lid;

a second hinge member fixed into a recess that is formed at a rear side of a top stiffener of the rear side panel of the box body; and a pivot member pivotably connected the first hinge member to the second hinge member.

According to an embodiment of the present disclosure, the first hinge member and the second hinge member are of the same shape, and both comprise a fixing portion engaged with and fixed to the box lid or the box body, and one or more pivot portions extending perpendicularly to the fixing portion, wherein the pivot portions are provided therein with through holes extending in parallel with the fixing portion for pivotably receiving a pivot.

According to an embodiment of the present disclosure, when there are multiple pivot portions, the pivot portions are spaced apart along the fixing portion and the space between the pivot portions is set to receive a respective pivot portion, and the through holes in the pivot portions are coaxial to one another.

According to an embodiment of the present disclosure, the pivot is provided at a proximal end with a flange having a size greater than the size of the through hole of the pivot portion, and the pivot at its distal end is provided with one or more cutouts extending from distal to proximal such that the distal end of the pivot forms a plurality of resilient arms extending from proximal to distal and being capable of bending radially inwards, wherein a radial outer surface of each resilient arm is provided thereon with a protruding portion which is configured to pass through the through hole of the pivot portion when the resilient arm is at a bent state, and not to pass the through hole of the pivot portion when the resilient arm is at a stretched state.

According to an embodiment of the present disclosure, each of the cutouts is tapered from distal to proximal and finally forms a smooth transition.

According to an embodiment of the present disclosure, the protrusion portion has a distal guiding bevel and a proximal guiding bevel.

According to an embodiment of the present disclosure, the hinge assembly is formed of plastic.

According to an embodiment of the present disclosure, the box lid and the box body are provided with a locking assembly, the locking assembly comprising:

a first locking member fixed to a front portion of the box lid;

a second locking member fixed to the front side panel of the box body; and a third locking member configured to be pivotably mounted to the first locking member.

According to an embodiment of the present disclosure, the first locking member is plugged into a bottom of a front stiffener of the box lid via snap-fit means at its top to form an inverted U shape as a whole, and a top stiffener of the front side panel of the box body is configured to be at least partially received in a recess of the inverted U shape when the box lid is closed.

According to an embodiment of the present disclosure, the first locking member is provided at its front portion with a horizontal connecting rod, and the third locking member is provided at its top with a hook which is configured to hook onto the horizontal connecting rod and pivot around the same in a certain range.

According to an embodiment of the present disclosure, the second locking member is plugged into the front side of the top stiffener of the front side panel of the box body via snap-fit means at its rear side, a top portion of the second locking member is bent rearwards to form a horizontal bent portion located at a step portion formed at the top of the front side panel of the box body, and the second locking member and the third locking member are configured to be latched or locked together when the box lid is closed.

According to an embodiment of the present disclosure, the locking assembly is formed of plastic.

According to an embodiment of the present disclosure, the box is provided with a foldable limit member for limiting an open angle of the box lid relative to the box body, and wherein the foldable limit member is an elongated rod-like member that includes a first end pivotably fixed at a position on an inner side of a side stiffener of the box lid at a distance from the pivot portion of the box lid, a second end opposite the first end pivotably fixed at a position on an inner side of a top stiffener of the respective side panel of the box body at a distance from the pivot portion of the box lid, and a bendable resilient body portion extending between the first end and the second end.

According to an embodiment of the present disclosure, a length of the foldable limit member is sized such that a maximum open angle of the box lid relative to the box body is greater than 90° and less than 180°.

According to an embodiment of the present disclosure, the body portion is of a flat strip shape suitable for bending, and the first end and the second end are flat end portions perpendicular to the body portion.

According to an embodiment of the present disclosure, the first end and the second end each comprises a lateral protruding portion, and receiving holes for receiving the protruding portions are disposed at corresponding positions of the stiffeners of the left side panel and/or the right side panel of the box body.

According to an embodiment of the present disclosure, the foldable limit member is a one-piece plastic member.

According to an embodiment of the present disclosure, the box is provided with a self-positioning assembly configured to arbitrarily remain an open angle of the box lid relative to the box body, the self-positioning assembly comprising:

a holder fixed onto the top stiffeners of the left side panel and/or the right side panel of the box body, wherein the holder is provided therein with a chute extending along the vertical direction through a top and a bottom surface of the holder, and a retaining hole extending along the horizontal direction to communicate with the chute and pass through a side surface of the holder facing the inside of the box body;

a support rod having a first end hinged to a respective side stiffener of the box lid and a second end extending through the chute, the support rod is configured to slide and swing in the chute; and a fastening assembly disposed in the retaining hole for applying a pressure to the support rod, wherein the fastening assembly is configured to adjust the magnitude of the pressure.

According to an embodiment of the present disclosure, an inner surface of the retaining hole is provided with an internal thread, the fastening assembly comprising:

a compression block disposed in the retaining hole and being movable along the retaining hole disposed in the same;

a bolt having an external thread which is configured to match with the internal thread of the retaining hole; and a resilient piece disposed in the retaining hole between the compression block and the bolt, which is configured to apply a resilient force to the compression block.

According to an embodiment of the present disclosure, the resilient piece is a compression spring, the compression block is provided thereon with a boss, and the compression spring is nested at one end onto the boss and abuts at the other end against an end of the bolt.

According to an embodiment of the present disclosure, the second end of the support rod is provided with a stopper for preventing the support rod from sliding out of the chute.

According to an embodiment of the present disclosure, the self-positioning assembly further comprises a hinge base connected to the side stiffener of the box lid, and the first end of the support rod is hinged to the hinge base.

According to an embodiment of the present disclosure, the hinge base is provided with positioning pins, and the side stiffener of the box lid is provided thereon with a plurality of positioning holes distributed along its longitudinal direction for receiving the positioning pins.

According to an embodiment of the present disclosure, the top stiffeners of the left side panel and/or the right side panel of the box body are provided with locking grooves into which the holder can be mounted.

According to an embodiment of the present disclosure, the self-positioning assembly is located within a receiving space formed by the box body and the box lid when the lid is closed.

According to an embodiment of the present disclosure, the support rod, the holder and the hinge base are all formed of plastic.

The single-layer plastic composite board has advantages such as a simple structure, small thickness, light weight, high strength, low cost and ease of manufacturing, and can be widely applied to a cabinet board, a box board, a table board, a drawer board, a seat board and a backrest of a chair and other applications.

BRIEF DESCRIPTION OF THE DRAWINGS

The above and other objectives, features, and advantages of the present disclosure will become more apparent, through the following detailed description of the example embodiments of the present disclosure with reference to the accompanying drawings in which the same reference symbols generally refer to the same component. It would be appreciated that the drawings are intended to illustrate preferred embodiments of the present disclosure, without suggesting any limitation to the scope, and respective components are not drawn to scale.

FIG. 7 is a sectional view of a stiffener according to a preferred embodiment of the present disclosure, where the stiffener has a cross section of a stepped shape;

FIG. 8 is a partial sectional view of a single-layer plastic composite board according to a preferred embodiment of the present disclosure, where the stiffener as shown in FIG. 7 is engaged with and fixed to a bent portion of the single-layer plastic sheet as shown in FIG. 1;

FIG. 9 is a partial sectional view of a single-layer plastic composite board according to a preferred embodiment of the present disclosure, where a bent portion of the single-layer plastic sheet is of a stepped shape, and the stiffener as shown in FIG. 7 is engaged with and fixed to the bent portion of the single-layer plastic sheet;

DETAILED DESCRIPTION

Hereinafter, reference will be made to the drawings to describe in more detail the single-layer plastic composite board according to the present disclosure. The description herein only involves preferred embodiments of the present disclosure, from which those skilled in the art can envisage other embodiments of the present disclosure that also fall into the scope of the present disclosure.

Figure 1:
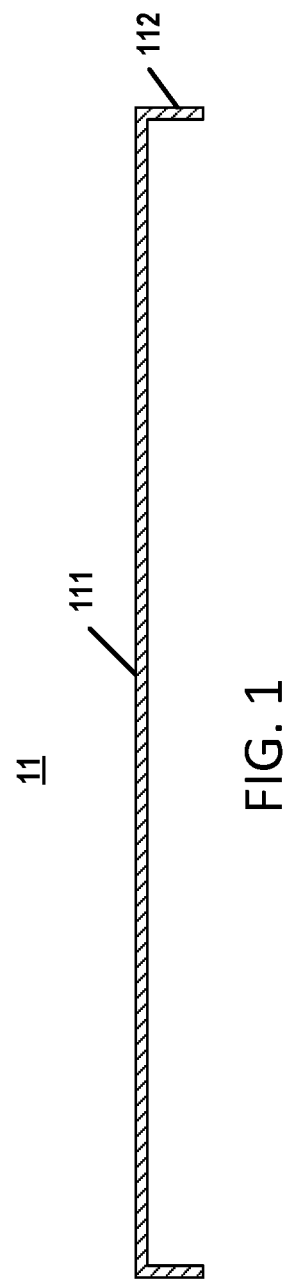
FIG. 1 is an exemplary sectional view of a single-layer plastic sheet according to a preferred embodiment of the present disclosure.
Figure 2:
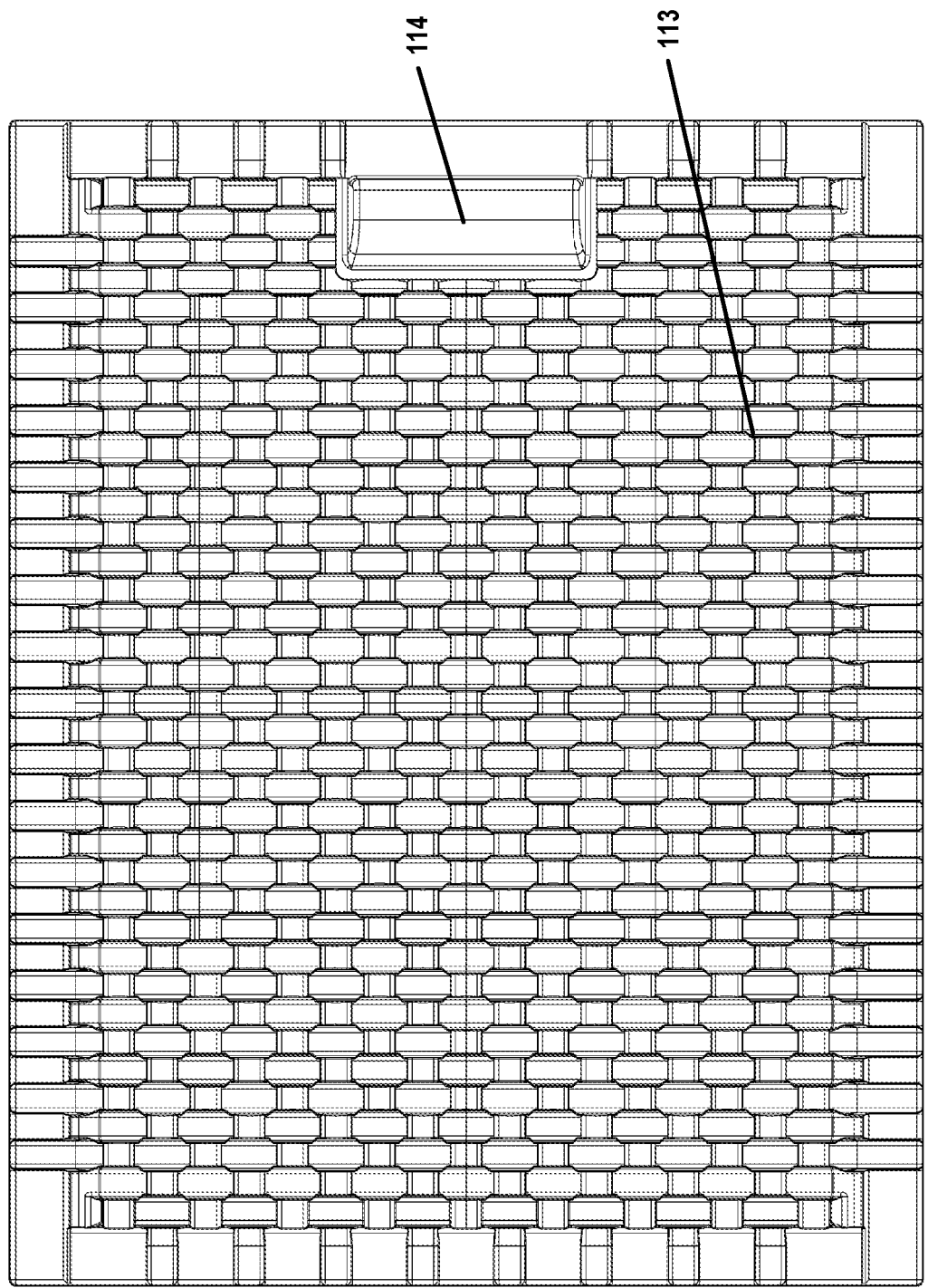
FIG. 2 is a front view of a single-layer plastic sheet according to a preferred embodiment of the present disclosure.

FIG. 1 is an exemplary sectional view of a single-layer plastic sheet according to a preferred embodiment of the present disclosure. As shown therein, a single-layer plastic sheet 11 includes: a planar-shaped main body portion 111 having a front surface and a rear surface opposite the front surface, and a peripheral portion located at a periphery of the main body portion 111, which is bent along a direction perpendicular to the main body portion 111 towards the rear surface to form a bent portion 112. The main body portion 111 may be provided thereon with a pattern formed by printing for aesthetic effect. In addition, the main body portion 111 may be formed with concave-convex configuration by only extruding or by extruding and then blister molding, such that it can play the role of reinforcing the strength of the single-layer plastic sheet, in addition to the aesthetic effect. Referring to FIG. 2 which is a front view of the single-layer plastic sheet in FIG. 1, the main body portion 111 of the single-layer plastic sheet 11 is provided thereon with concave-convex configuration 113, and the concave-convex configuration 113 is grid-like, to further reinforce the strength of the single-layer plastic sheet 11. Moreover, the pattern or the concave-convex configuration may follow original shapes of some natural materials (e.g., a shape of woven rattan as shown exemplarily in FIG. 2) according to the application scenarios and the aesthetic needs. As shown in FIG. 2, the concave-convex configuration 113 may further form a grasp feature 114 of an ergonomic design for hand-holding convenience.

Figure 3:
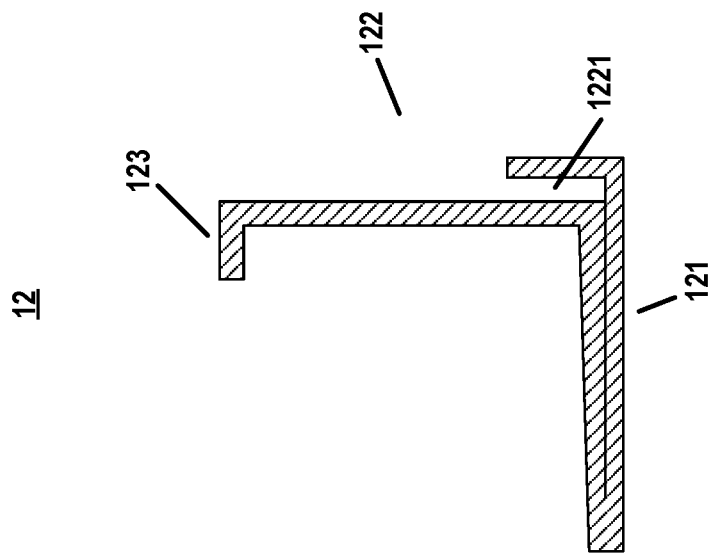
FIG. 3 is a sectional view of a metal stiffener according to a preferred embodiment of the present disclosure.

FIG. 3 is a sectional view of a metal stiffener according to a preferred embodiment of the present disclosure. The metal stiffener 12 is a strip-like or frame-like component formed by bending or rolling a single-layer metal board. FIG. 3 specifically illustrates a sectional shape of an example metal stiffener. As shown therein, as observed from the cross section, the metal stiffener 12 includes a first section 121 and a second section 122. The first section 121 has a double-layer structure in which the length of the outer layer is greater than that of inner layer. An end portion of the outer layer of the first section 121 is bent as extending partial length of the second section 122 along the outside of the second section 122 and in parallel with the second section 122, such that a gap 1221 is formed between the end portion of the outer layer of the first section 121 and the second section. Two layers of metal plates overlap in part with a gap 1221 formed therebetween. The shape and size of the gap 1221 is fit with the shape and thickness of the bent portion 112 of the single-layer plastic sheet 11 as shown in FIG. 1, respectively. When the metal stiffener 12 is nested onto the bent portion 112 of the single-layer plastic sheet 11, the gap 1221 can receive closely therein at least a part of the bent portion 112.

Figure 4:
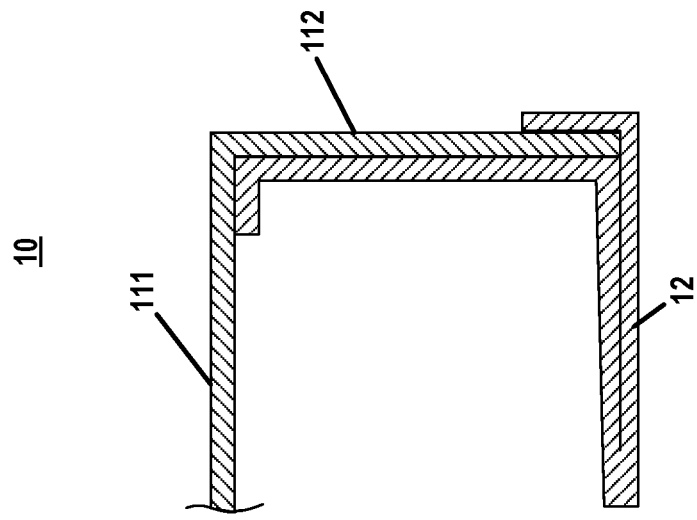
FIG. 4 is a partial sectional view of a single-layer plastic composite board according to a preferred embodiment of the present disclosure, where the metal stiffener as shown in FIG. 3 is assembled with the single-layer plastic sheet as shown in FIG. 1.

FIG. 4 is a partial sectional view of a single-layer plastic composite board 10 according to a preferred embodiment of the present disclosure. As shown, the single-layer plastic composite board 10 is a two-piece single-layer plastic composite board including a single-layer plastic sheet 11 as shown in FIG. 1 and the metal stiffener 12 as shown in FIG. 3, where a part of the bent portion 112 of the single-layer plastic sheet 11 is closely fit into the gap 1221 of the second section 122 of the metal stiffener 12. The single-layer plastic sheet 11 and the metal stiffener 12 may be fixed to each other via an adhesive, such as glue, etc., or in other manners, for example, through a friction force, or the like.

In another preferred embodiment of the present disclosure, the metal stiffener 12 may also include a third section 123. The third section 123 is adjacent to the second section 122, which extends from an end of the second section towards the inner side of the second section along a direction perpendicular to the second section. When the metal stiffener 12 is nested onto the bent portion 112 of the single-layer plastic sheet 11, the third section 123 abuts against the main body portion 111 of the single-layer plastic sheet 11. Such structure cannot only further enlarge the adhesion area of the single-layer plastic sheet 11 to the metal stiffener 12 to achieve more reliable fixing therebetween, but also reinforce strength of an edge of the single-layer plastic composite board due to provision of support to the edge of the main body portion 111 of the single-layer plastic sheet 11 via the third section 123.

It is worth noting that the metal stiffener 12 may be an integral frame structure adapted to the peripheral shape of the single-layer plastic sheet 11, or may be a structure formed by a plurality of bar-type components which is adapted to the peripheral shape of the single-layer plastic sheet. In addition, the third section 123 is optional, i.e., the metal stiffener 12 may be comprised of the first section 121 and the second section 122 only.

Figure 5:
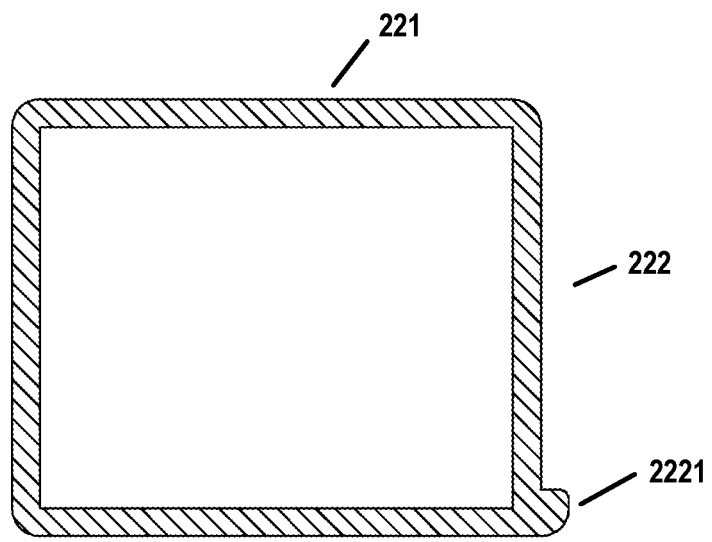
FIG. 5 is a sectional view of a stiffener according to a preferred embodiment of the present disclosure, where the stiffener has a square tubular cross section.

The stiffener in the single-layer plastic composite board according to the present disclosure may be in other forms. For example, the stiffener may be a metal tube or plastic tube with a closed cross-sectional shape formed by extruding. Such type of stiffener has advantages of ease of manufacturing and low cost. Moreover, due to the closed cross-sectional shape, the stiffener has higher strength and thus can better support the single-layer plastic sheet by providing extra strength thereto, such that the single-layer plastic sheet can be formed in a small thickness, thereby further reducing the materials and lowering the cost. FIG. 5 exemplarily illustrates a cross-sectional view of a stiffener 22 according to a preferred embodiment of the present disclosure, wherein the stiffener 22 has a closed square cross-sectional shape. As can be seen therefrom, the stiffener 22 includes a first section 221 and a second section 222 adjacent and perpendicular thereto, and the second section 222 at the end away from the first section 221 is formed thereon with a flange 2221 extending towards the outside of the stiffener 222 along a direction perpendicular to the second section 222.

Figure 6:
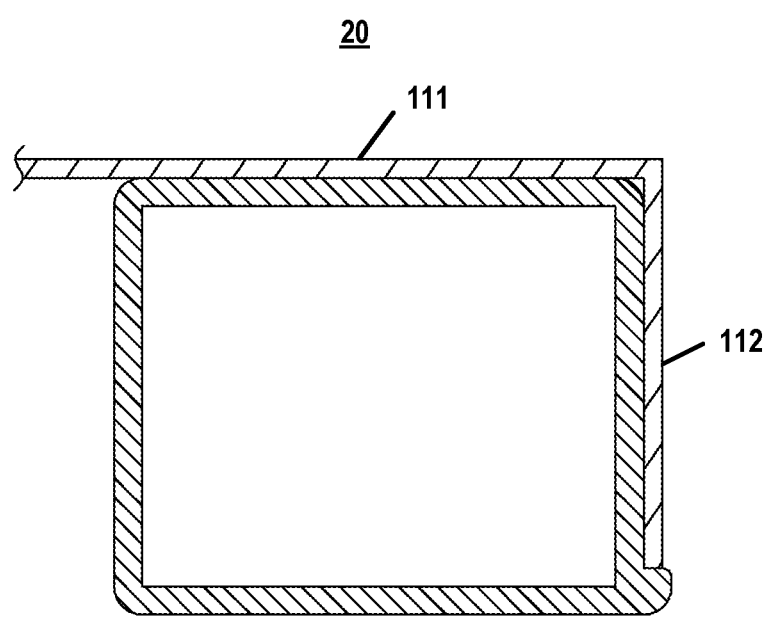
FIG. 6 is a partial sectional view of a single-layer plastic composite board according to a preferred embodiment of the present disclosure, where the stiffener as shown in FIG. 5 is engaged with and fixed to a bent portion of the single-layer plastic sheet as shown in FIG. 1.

FIG. 6 is a partial cross-sectional view of a single-layer plastic composite board 20 according to a preferred embodiment of the present disclosure, where the stiffener 22 as shown in FIG. 5 is engaged with and fixed to the single-layer plastic sheet 11. As shown, the first section 221 abuts against the main body portion 111 of the single-layer plastic sheet 11 and the second section 222 abuts against the bent portion 112 of the single-layer plastic sheet 11. The width of the flange 2221 on the second section 222 is substantially equal to the thickness of the single-layer plastic sheet 11. The flange 2221 is engaged with the edge of the bent portion 112, to further support and fix the single-layer plastic sheet 11.

FIG. 7 exemplarily illustrates a cross-sectional view of a stiffener 32 according to a preferred embodiment of the present disclosure, where the stiffener 32 is a recessed tube with a closed cross-sectional shape, and the recessed shape, for example, may be a stepped shape. As shown, the stiffener 32 includes a first section 321 and a second section 322 extending perpendicularly to the first section 321, and the second section 322 at its end away from the first section 321 is likewise formed with a flange 3221 extending along a direction vertical to the second section 322 towards the outside of the stiffener 32. Different than the stiffener 22, the stiffener 32 further includes a third section 323 located between the first section 321 and the second section 322 and recessed into the tube, which forms, in combination with the first section 321 and the second section, a stepped shape.

FIG. 8 is a partial sectional view of a single-layer plastic composite board 30 according to a preferred embodiment of the present disclosure, where the stiffener 32 as shown in FIG. 7 is engaged with and fixed to the single-layer plastic sheet 11. As shown, the first section 321 abuts against the main body portion 111 of the single-layer plastic sheet 11 while the second section 322 abuts against the bent portion 112 of the single-layer plastic sheet 11, and the width of the flange 3221 on the second section 322 is substantially equal to the thickness of the bent portion 122. The flange 3221 is engaged with the edge of the bent portion 122, so as to further support and fix the single-layer plastic sheet 11. Given that the third section is recessed, a hollow cavity is formed between the third section 323 and the single-layer plastic sheet 11.

FIG. 9 is a partial sectional view of a single-layer plastic composite board 40 according to a preferred embodiment of the present disclosure, where the stiffener 32 as shown in FIG. 7 is engaged with and fixed to the single-layer plastic sheet 21. Unlike the single-layer plastic sheet 11, the bent portion 212 of the single-layer plastic sheet 21 is of a stepped shape that matches the shape formed by the second section 322 and the third section 323 of the stiffener 32. More specifically, the first section 322 abuts against the edge of the planar-shaped main body portion 211 of the single-layer plastic sheet 21 while the second section 322 and third section 323 abut against the bent portion 212 of the single-layer plastic sheet 21. Similarly, the width of the flange 3221 on the second section 322 is substantially equal to the thickness of the single-layer plastic sheet 21, and the flange 3221 is engaged with the edge of the bent portion 212, so as to further support and fix the single-layer plastic sheet 21.

Figure 10A:
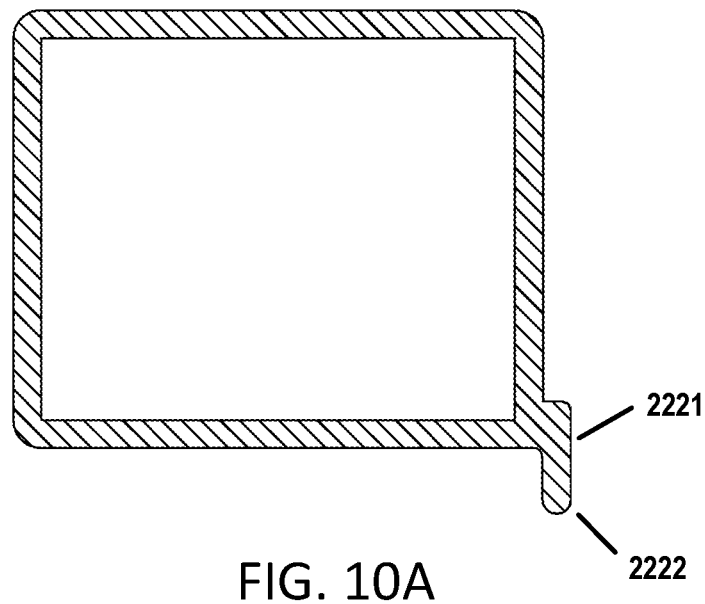
FIGS. 10A and 10B are sectional views of a stiffener of a single-layer plastic composite board according to preferred embodiments of the present disclosure, where a wing for blocking water is shown.
Figure 10B:
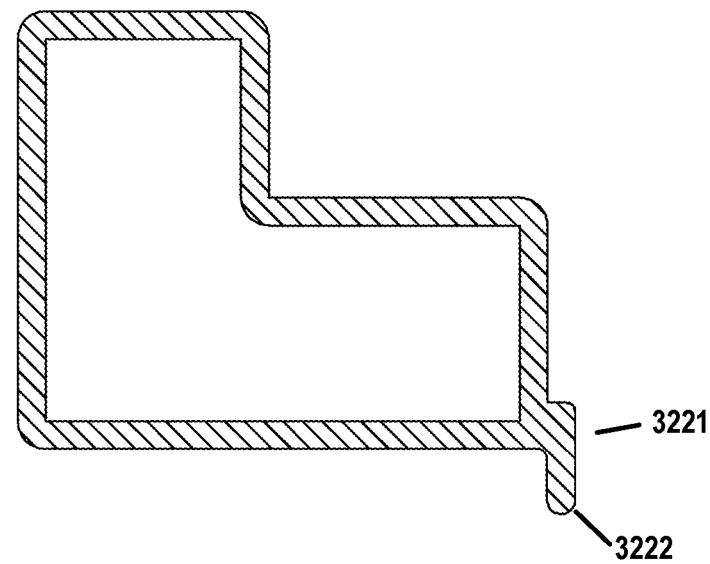

FIGS. 10A and 10B exemplarily illustrate sectional views of a stiffener of a single-layer plastic composite board according to preferred embodiments of the present disclosure, where flanges 2221 and 3221 of the stiffeners at respective lower ends are further provided with wings 2222, 3222 extending downwards, respectively.

It should be noted that the first sections in the above-mentioned embodiments may not abut against the main body portion of the single-layer plastic sheet, unlike what is shown in the figures, which may be spaced in a certain gap from the edge of the main body portion, in other preferred embodiments of the present disclosure. Aside from this, the stiffener according to the above-mentioned embodiments may be an integral frame structure adapted to the peripheral shape of the single-layer plastic sheet, or may be a structure formed by a plurality of bar-type components which is adapted to the peripheral shape of the single-layer plastic sheet. The stiffener according to the above-mentioned embodiments may be fixed to the single-layer plastic sheet via an adhesive, such as glue, etc. If formed of plastic, the stiffener may be connected fixedly by ultrasonic welding.

Figure 11:
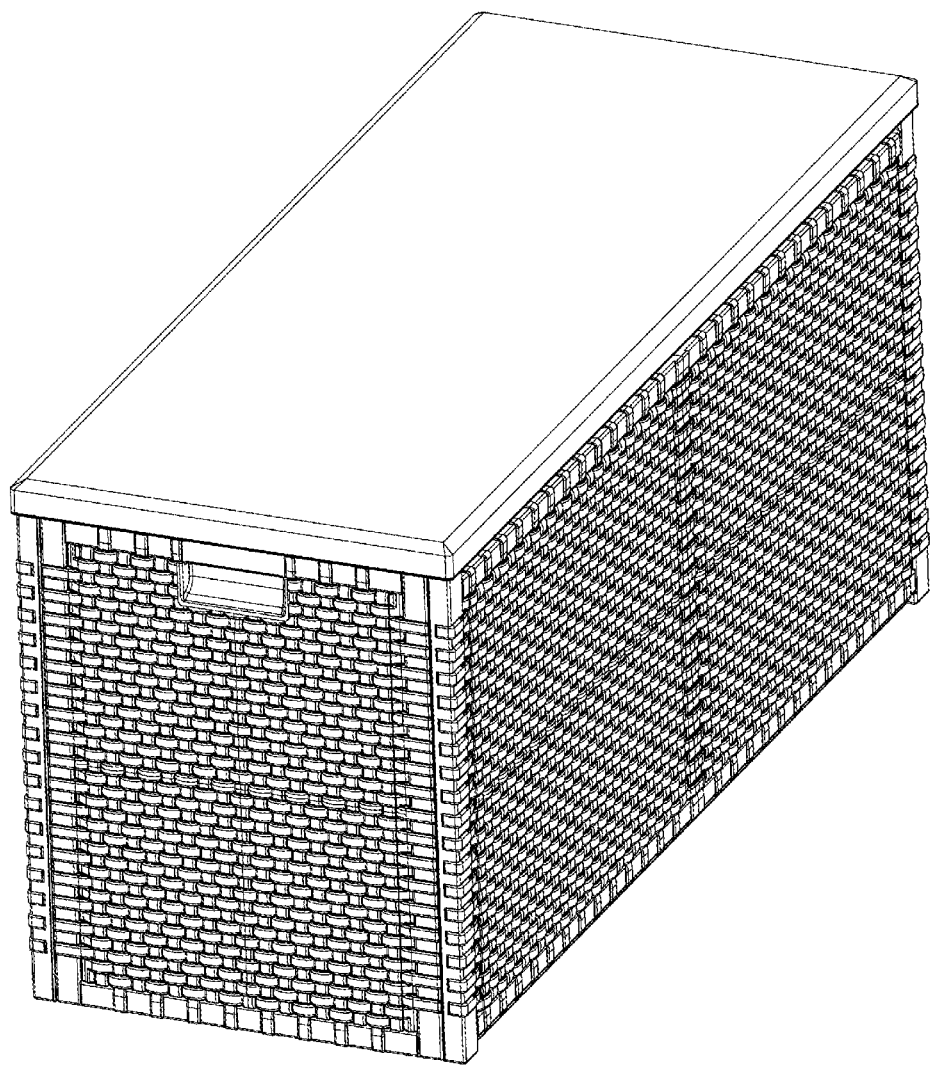
FIG. 11 is a perspective view of a box according to a preferred embodiment of the present disclosure, including a single-layer plastic composite board according to the present disclosure.
Figure 12:
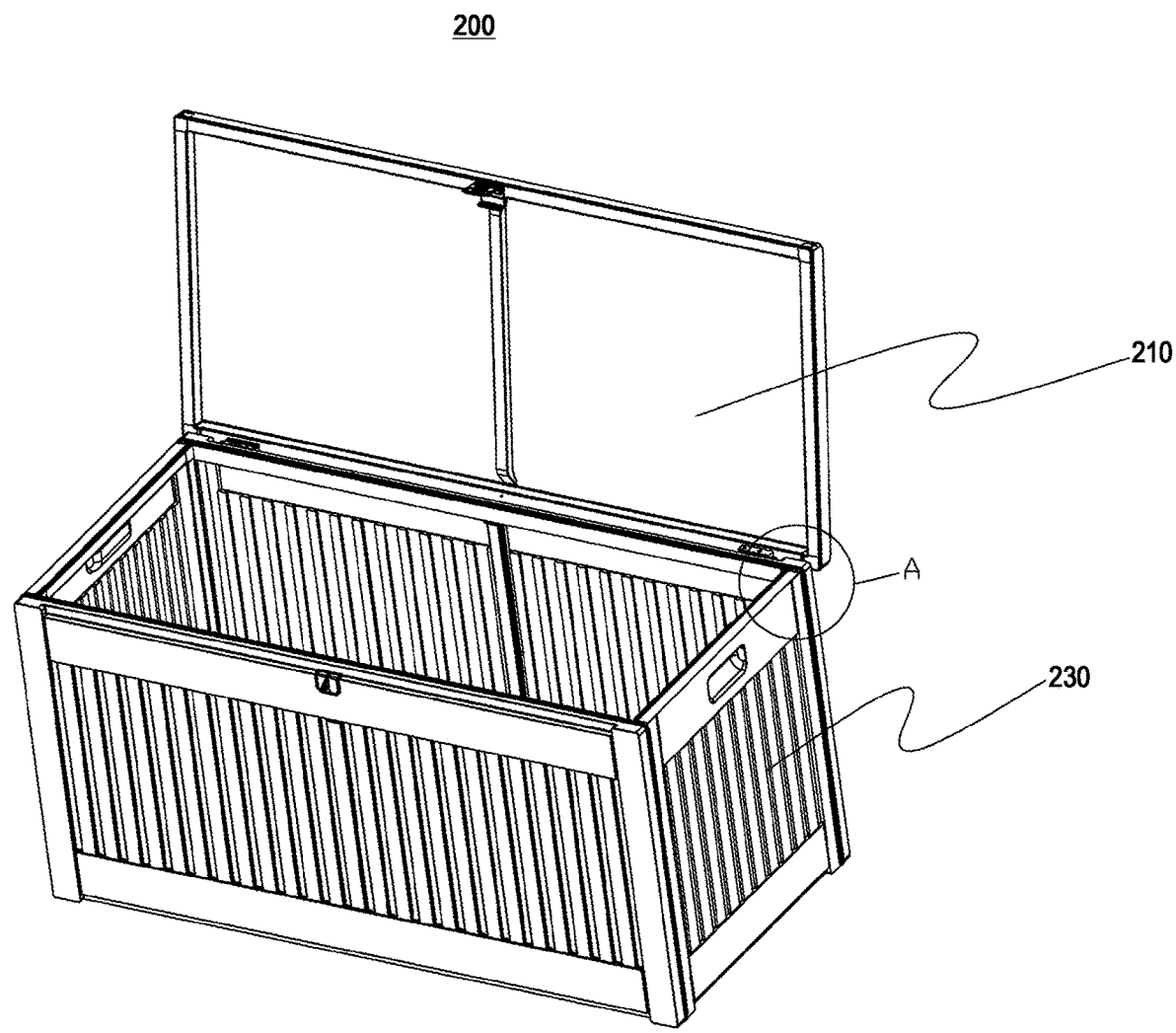
FIG. 12 is a perspective view of a box according to a preferred embodiment of the present disclosure, including a single-layer plastic composite board according to the present disclosure.
Figure 13:
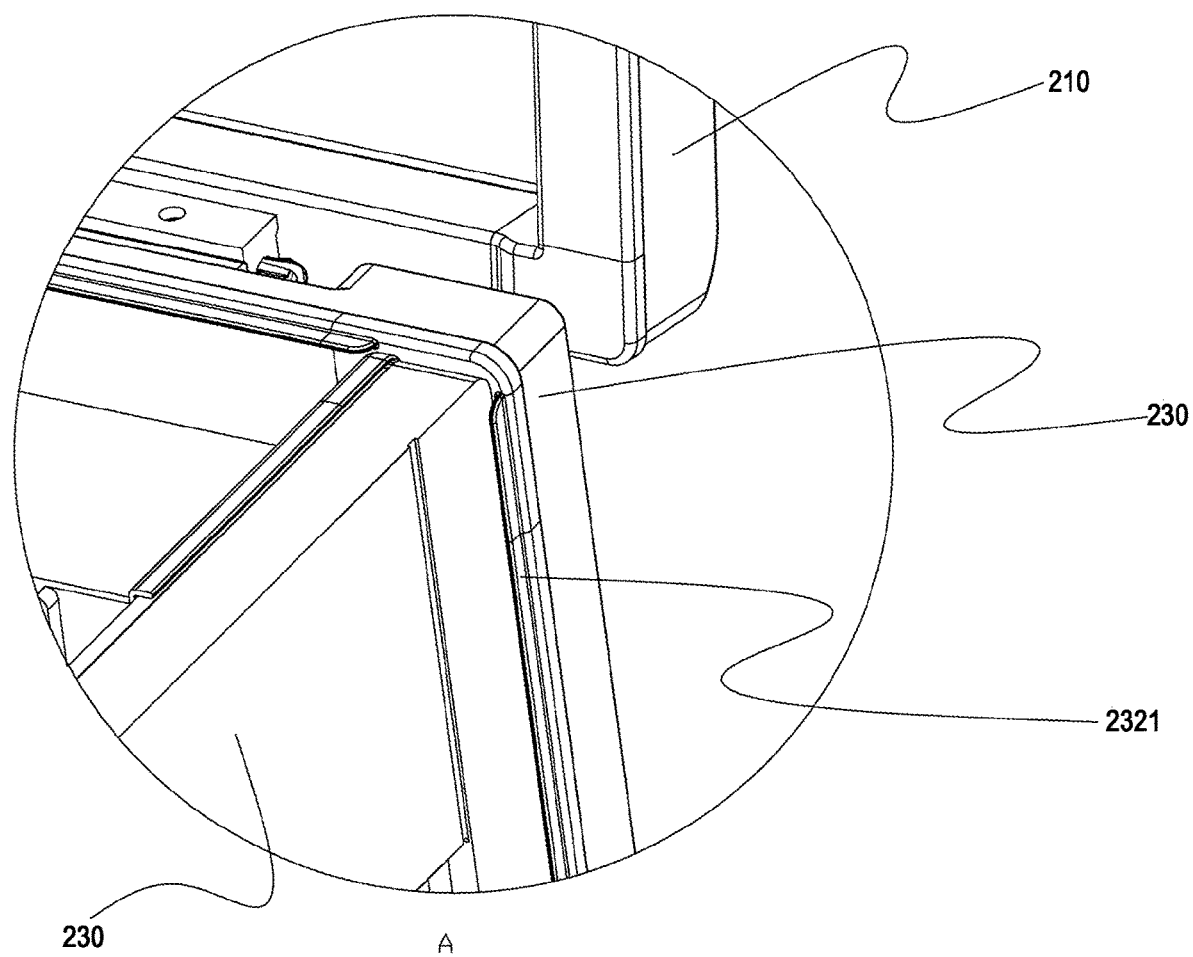
FIG. 13 is an enlarged view of the circle A in FIG. 12.
Figure 14:
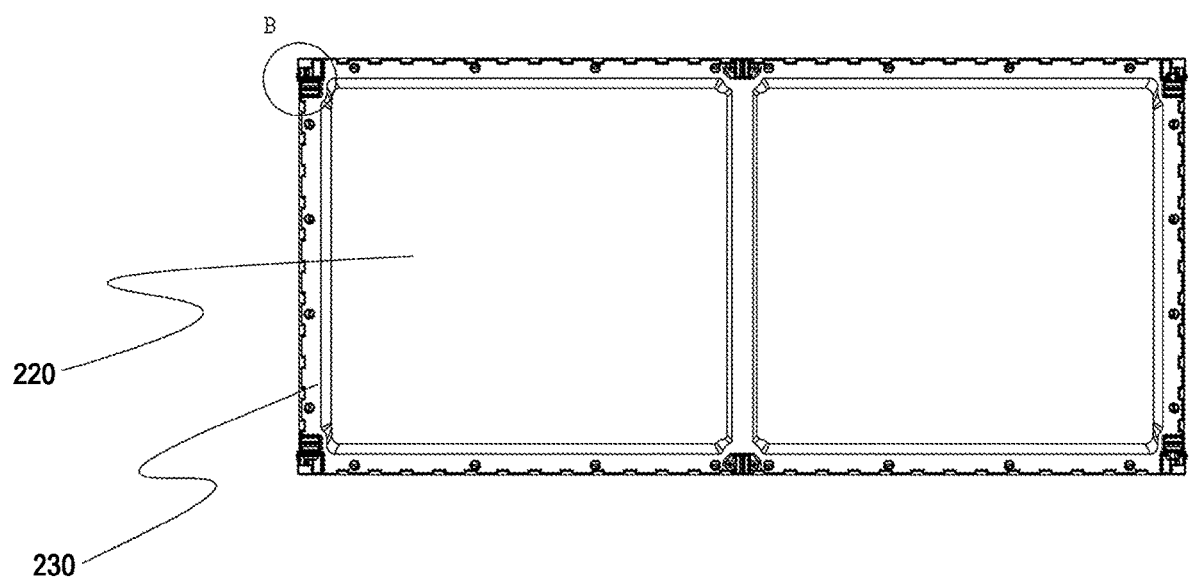
FIG. 14 is a sectional view of the box as shown in FIG. 12.
Figure 15:
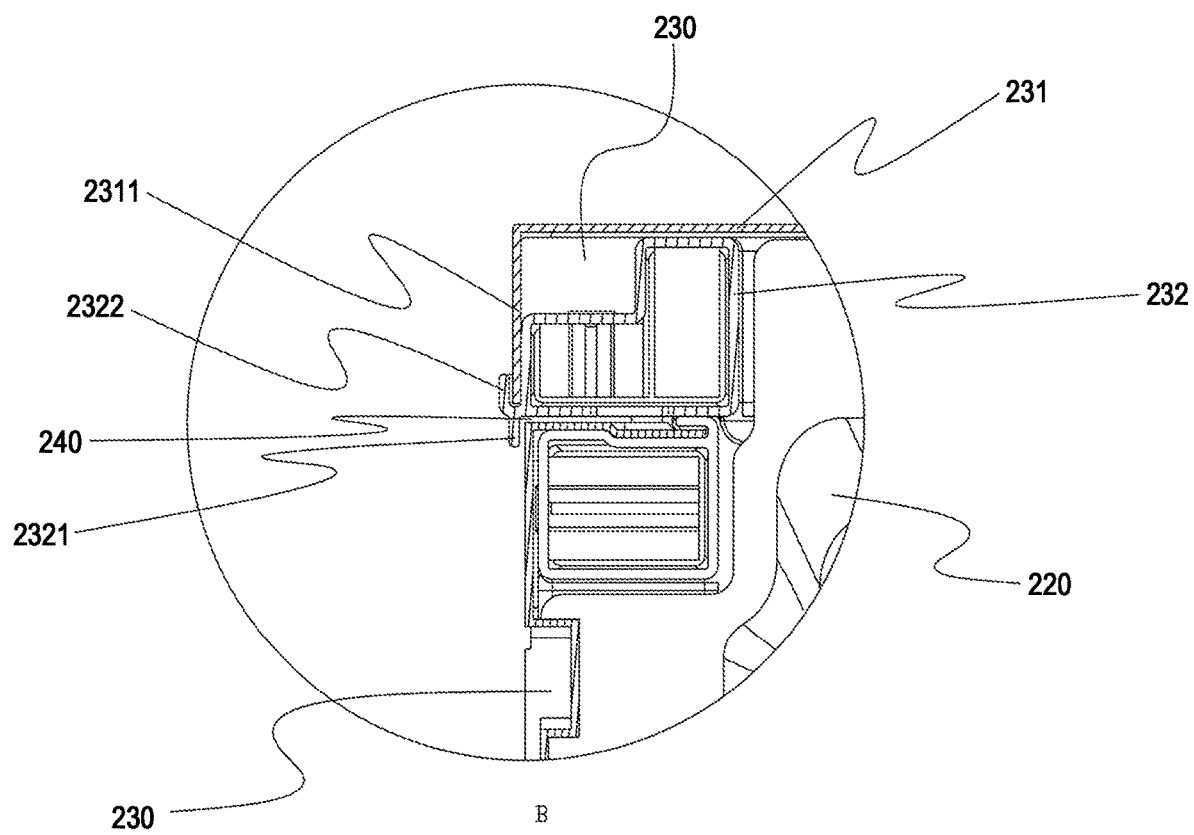
FIG. 15 is an enlarged view of the circle B in FIG. 14.
Figure 16:
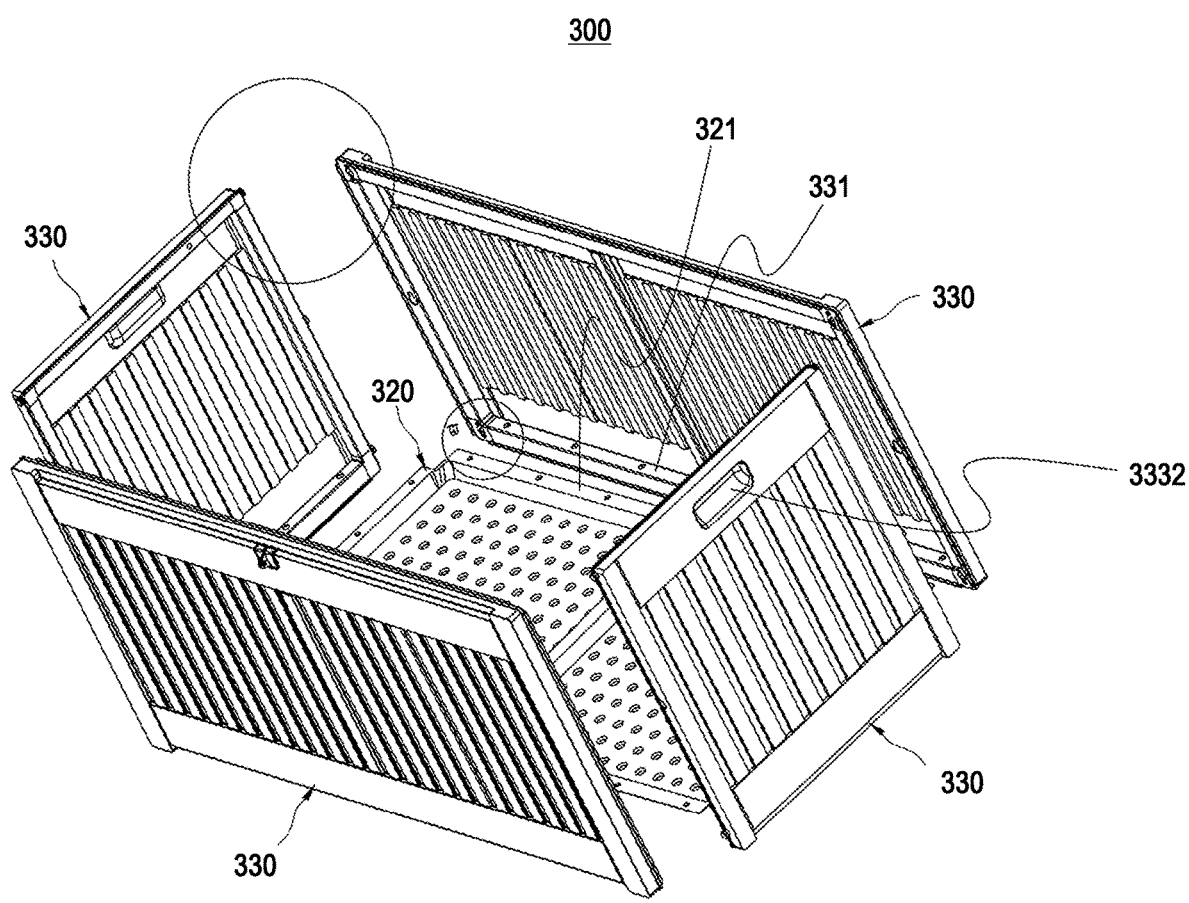
FIG. 16 is an exploded view of a box according to a preferred embodiment of the present disclosure, where a connection assembly for connecting with side panels and a floor panel are shown.
Figure 17:
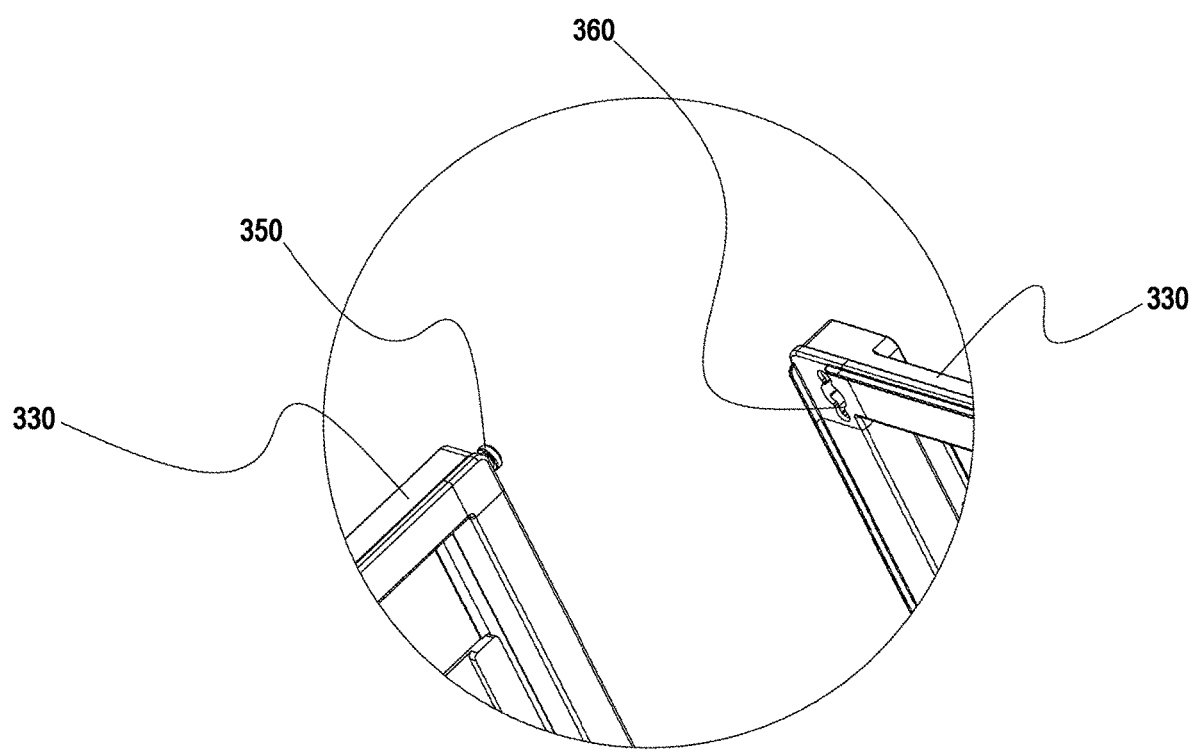
FIG. 17 is an enlarged view of the circle A in FIG. 16.
Figure 18:
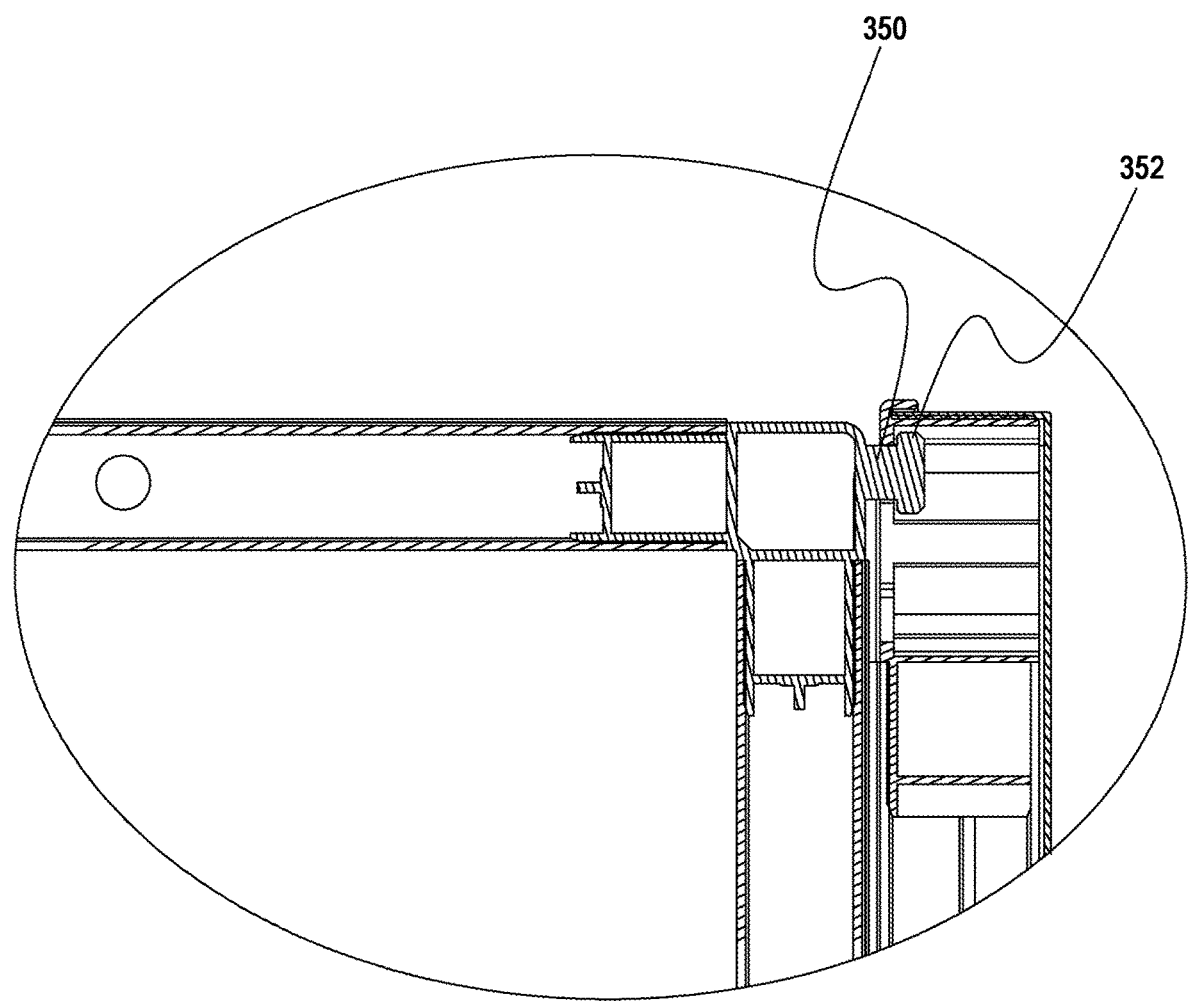
FIG. 18 schematically illustrate the connection between adjacent side panels of the box as shown in FIG. 16.
Figure 19:
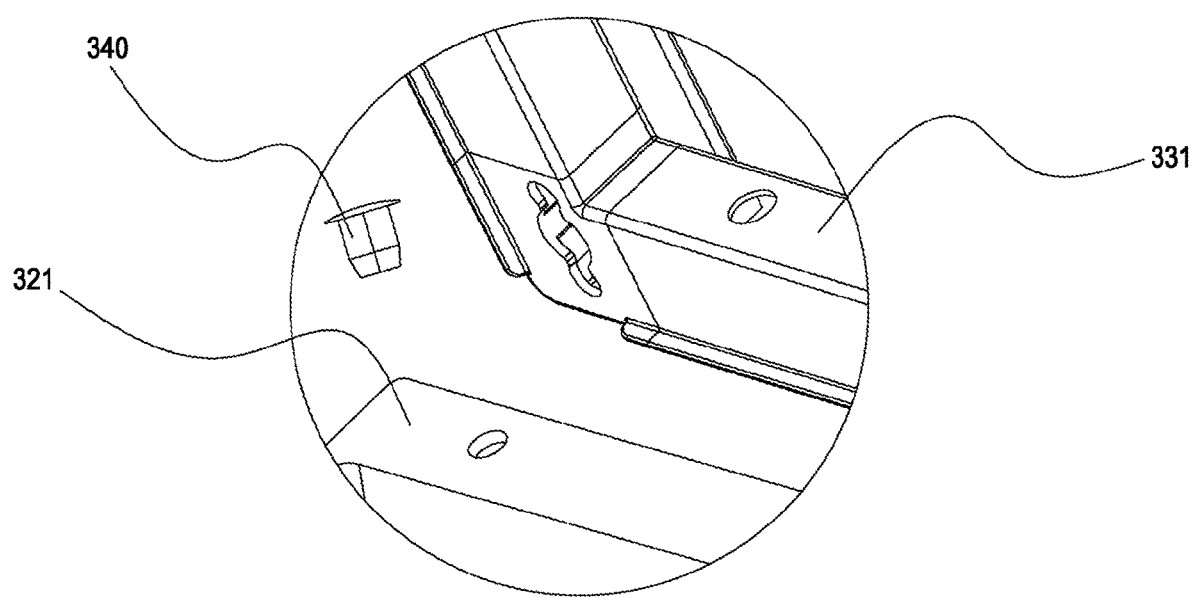
FIG. 19 is an enlarged view of the circle B in FIG. 16.
Figure 20:
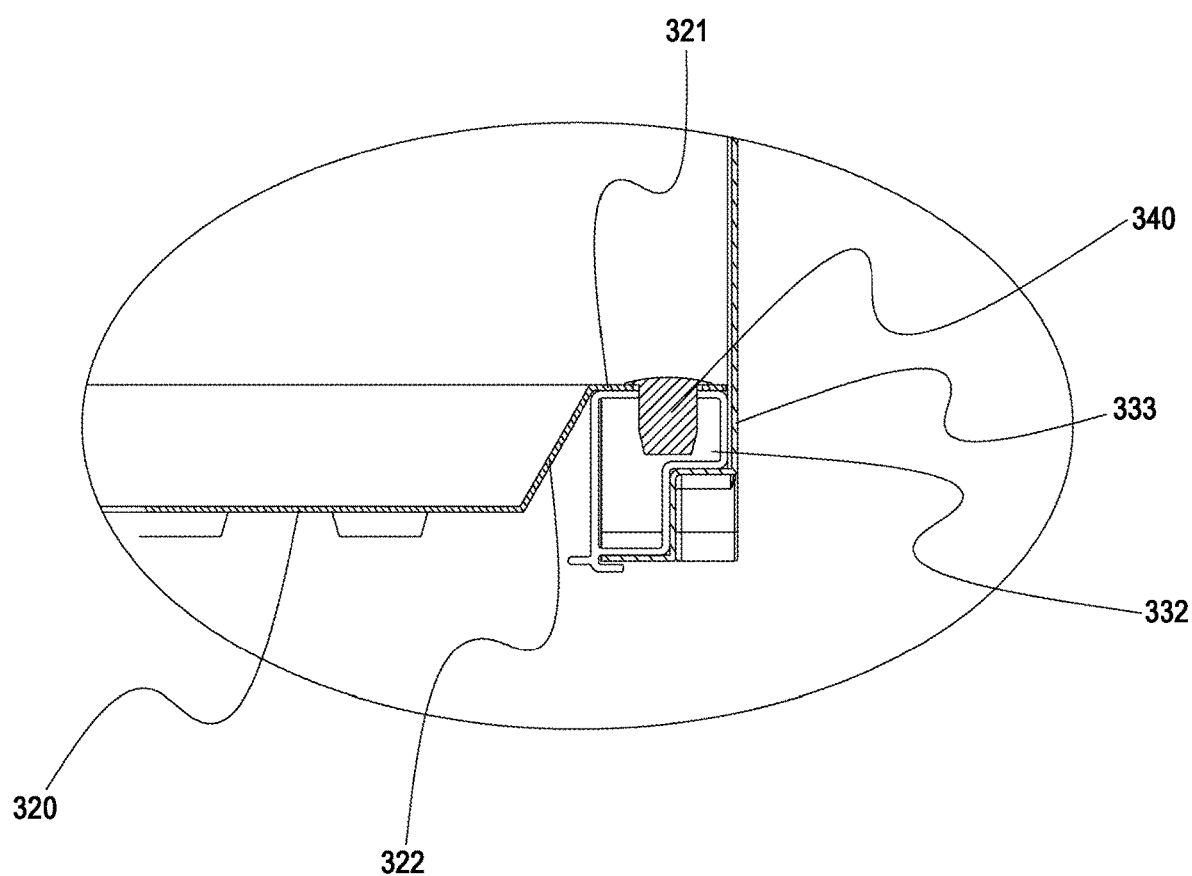
FIG. 20 schematically illustrate the connection between the floor panel and a side panel of the box as shown in FIG. 16.
Figure 21:
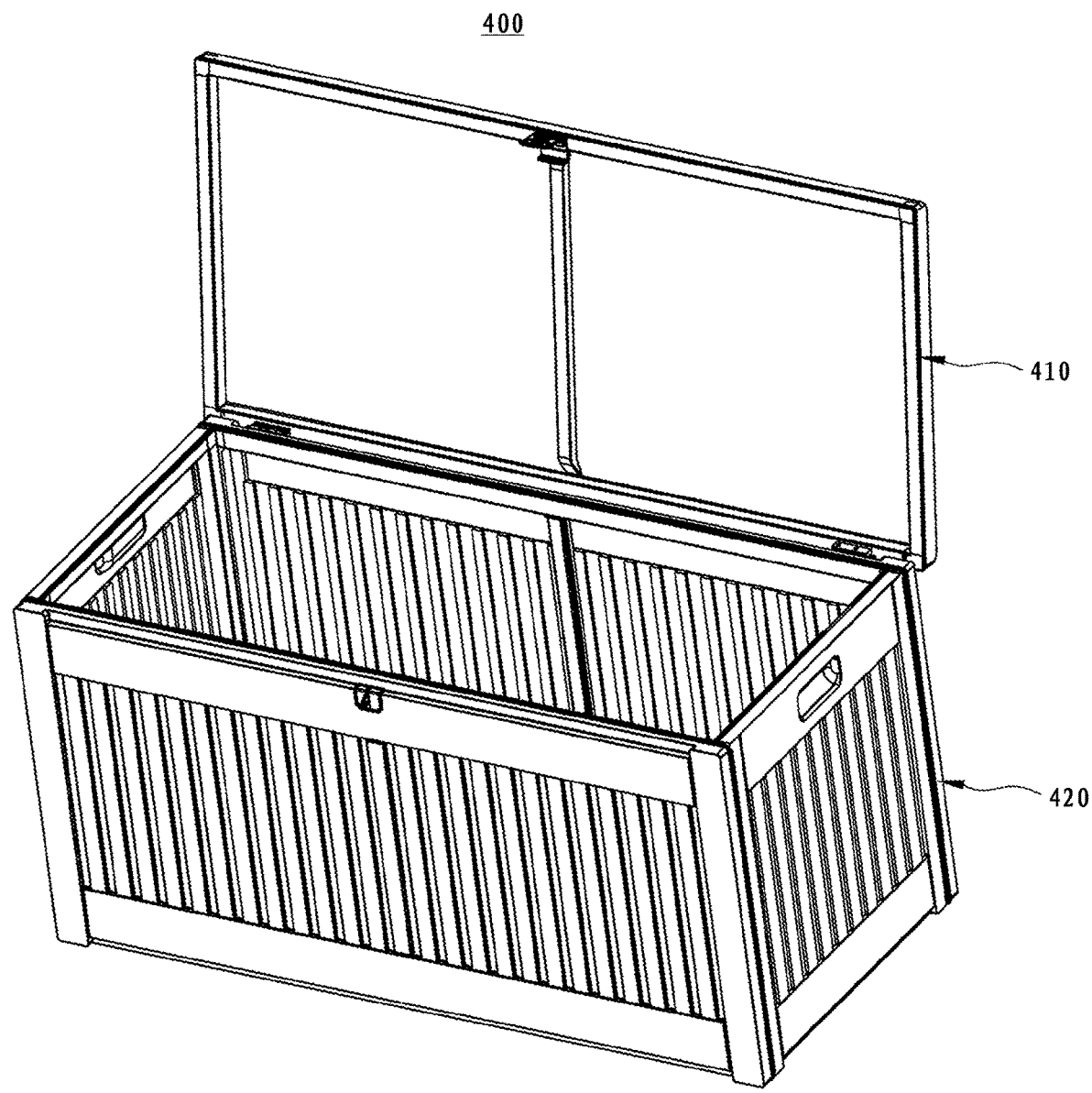
FIG. 21 is a perspective view of a box according to a preferred embodiment of the present disclosure, including a hinge assembly for pivotally connecting a box lid to a box body.
Figure 22:
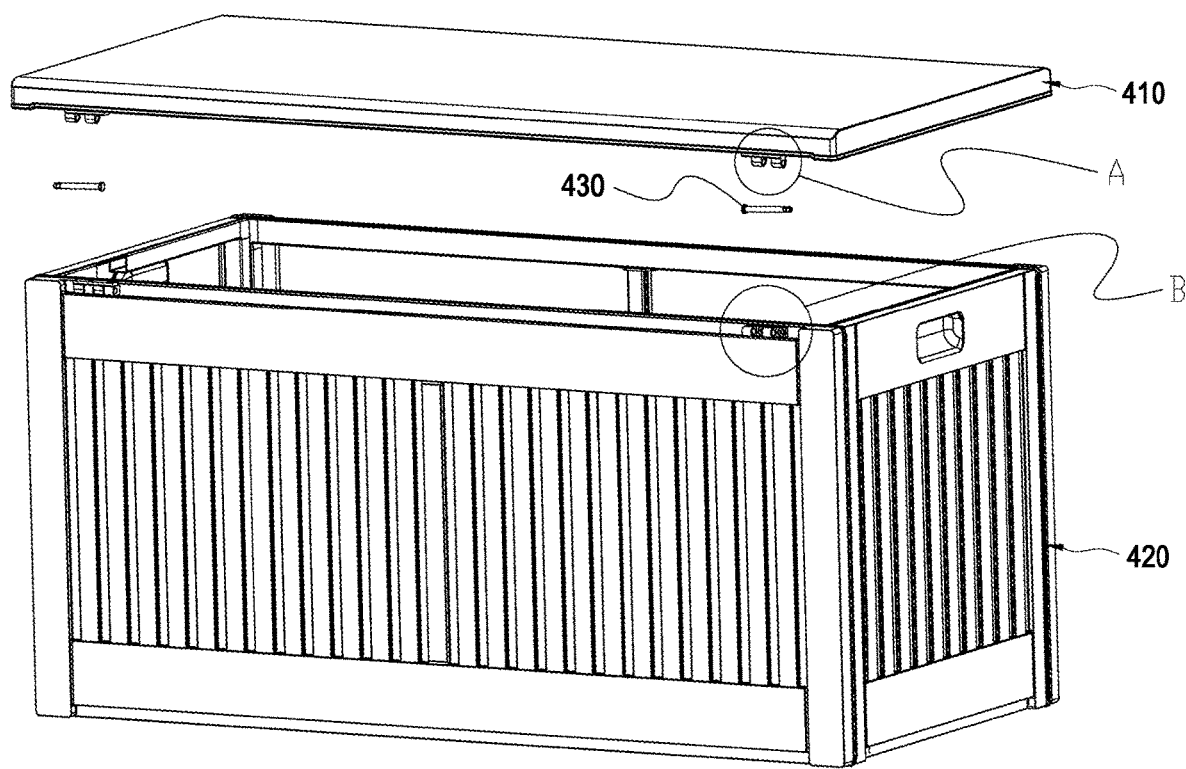
FIG. 22 is a perspective view of a hinge assembly when a box lid is separated from a box body.
Figure 23:
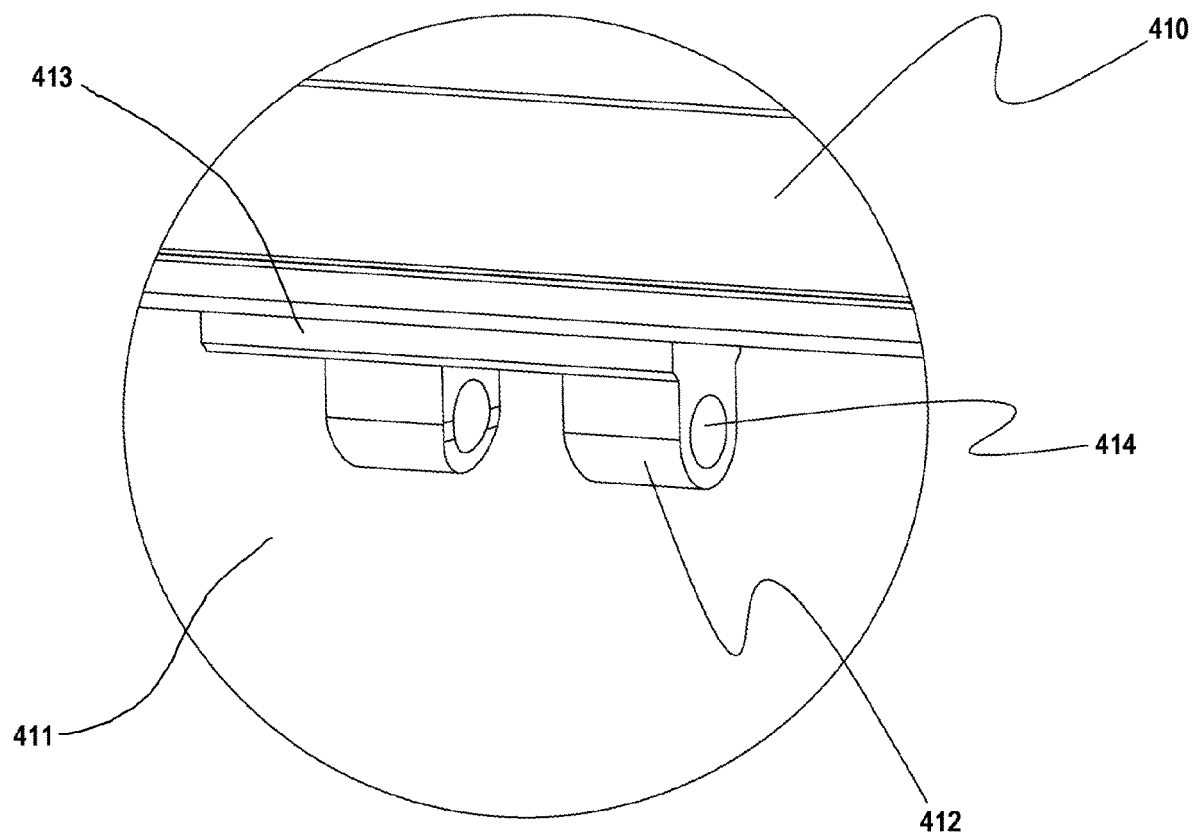
FIG. 23 is an enlarged view of the circle A in FIG. 22.
Figure 24:
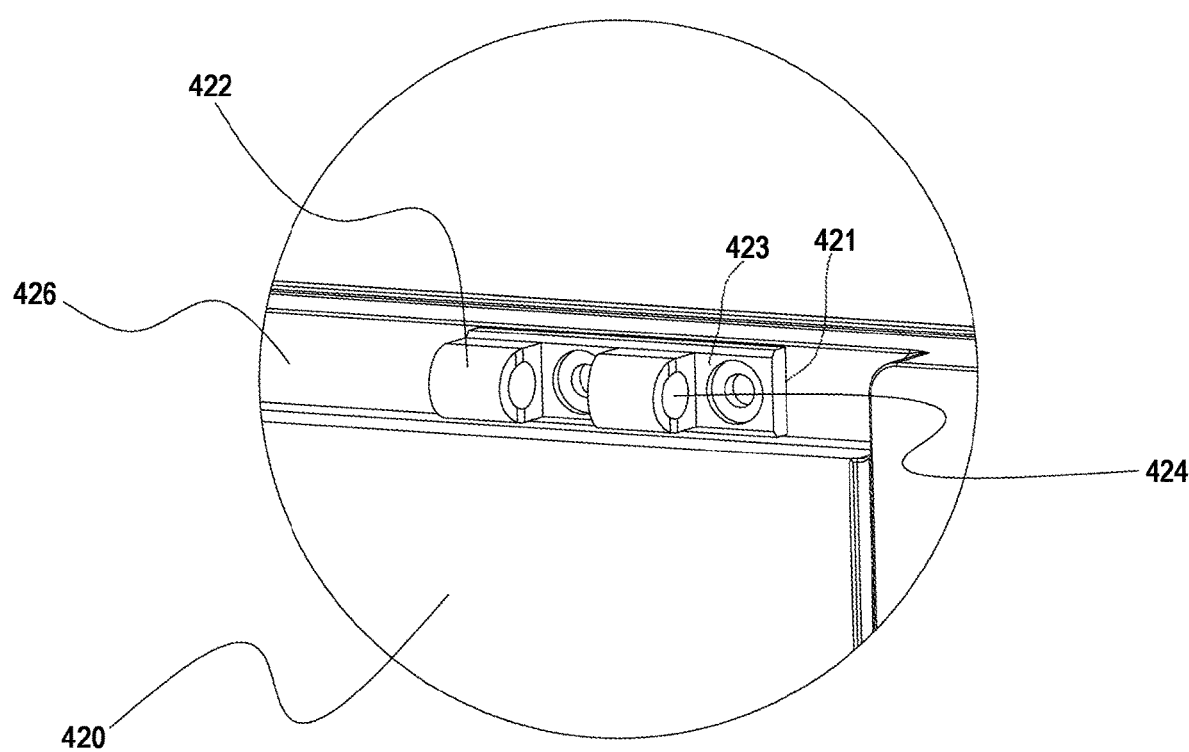
FIG. 24 is an enlarged view of the circle B in FIG. 22.
Figure 25:
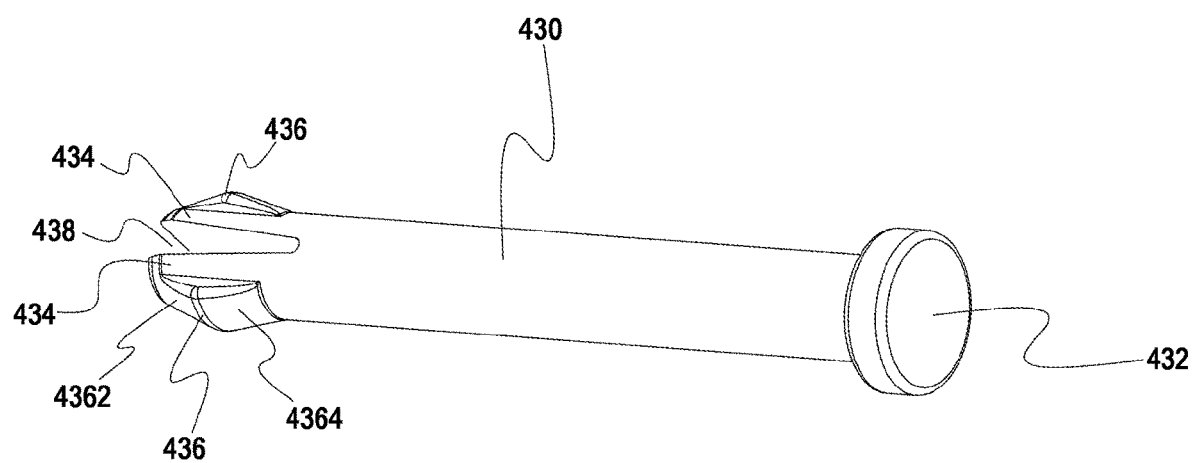
FIG. 25 is a perspective view of a pivot member.
Figure 26:
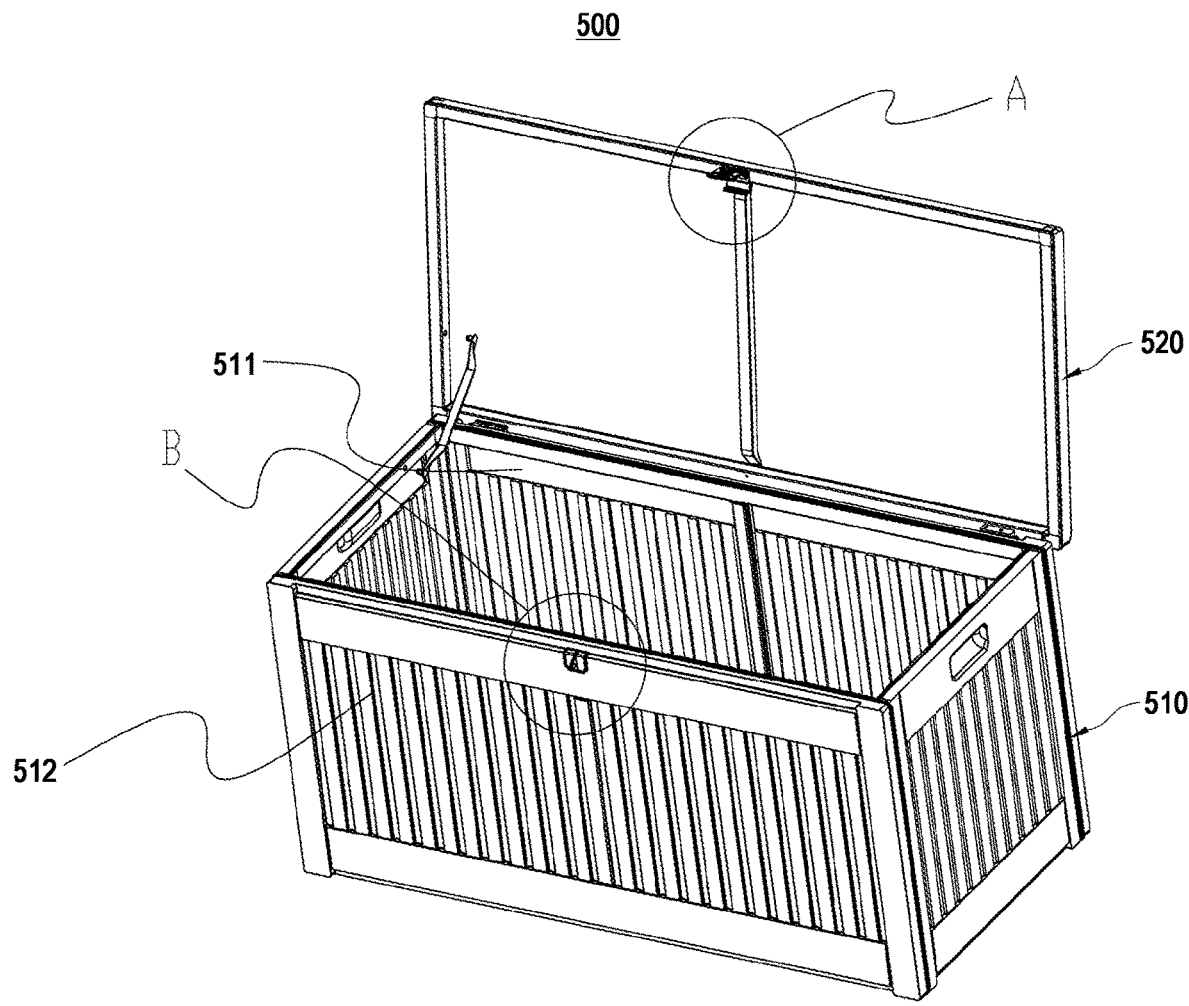
FIG. 26 is a perspective view of a box according to a preferred embodiment of the present disclosure, including a locking assembly configured to reinforce flexural strength of a front side panel of a box.
Figure 27:
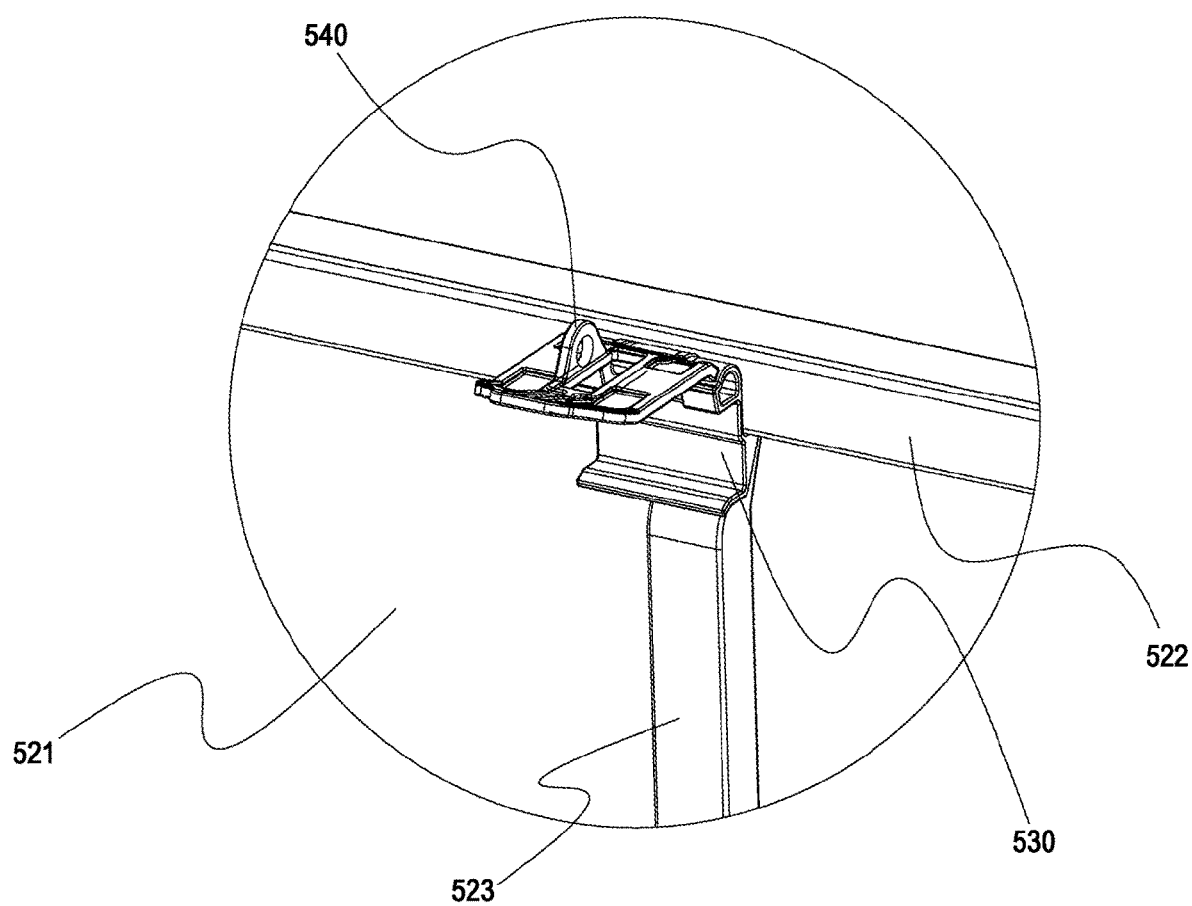
FIG. 27 is an enlarged view of the circle A in FIG. 26.
Figure 28:
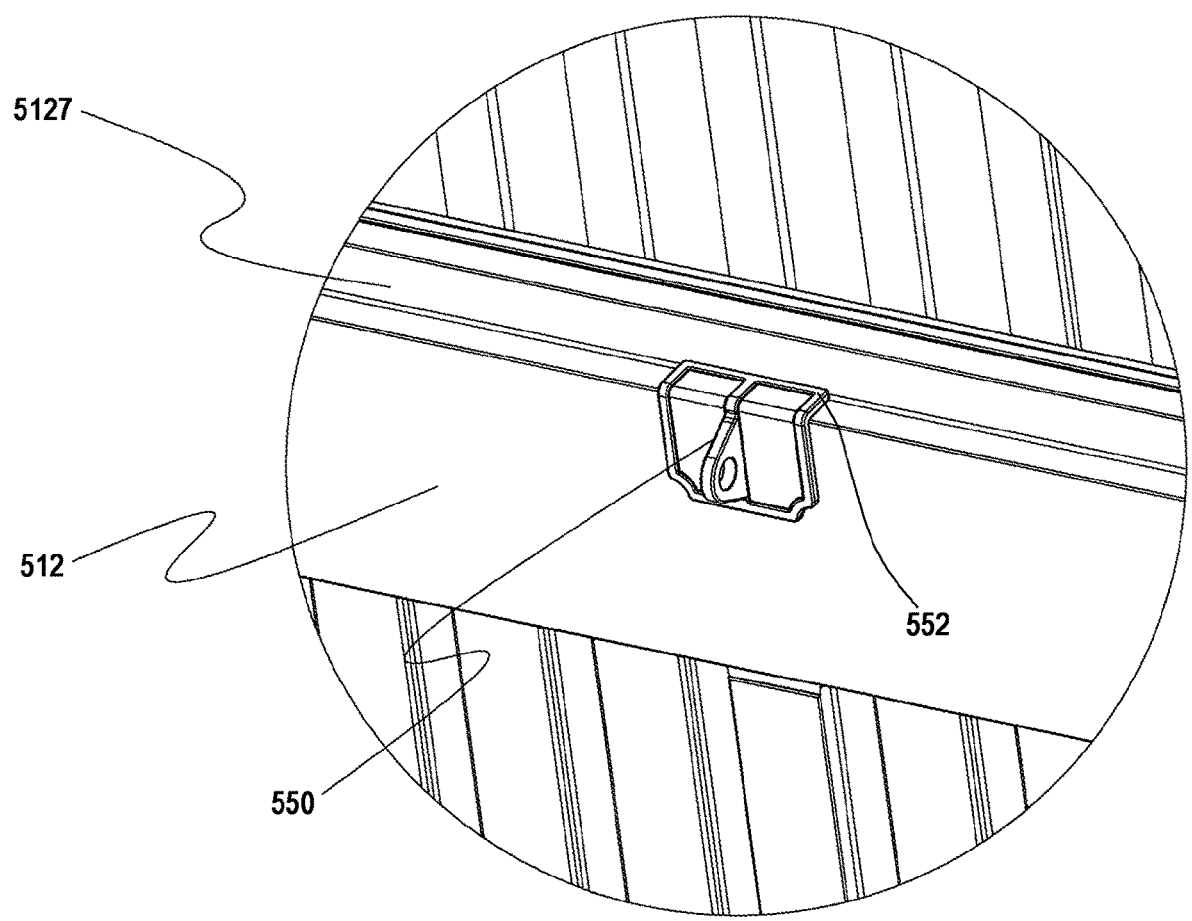
FIG. 28 is an enlarged view of the circle B in FIG. 26.
Figure 29:
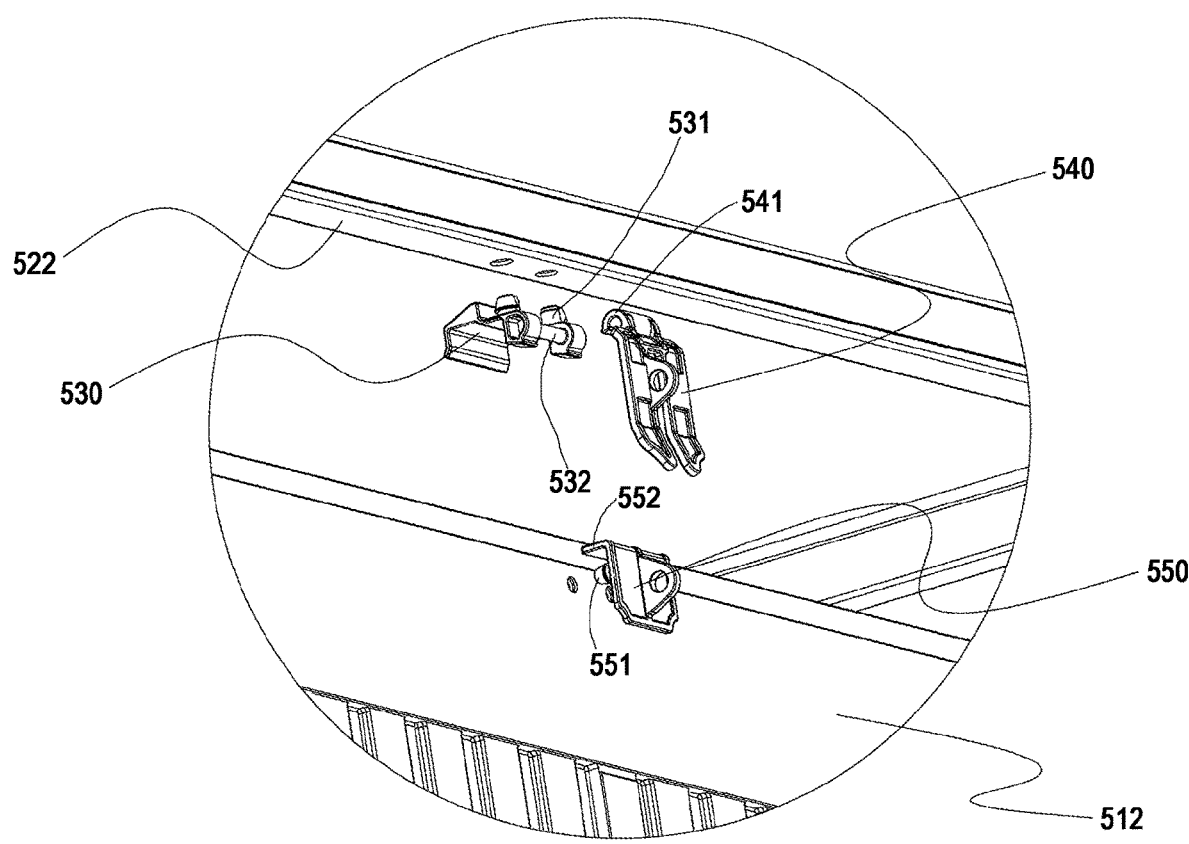
FIG. 29 is an exploded view of a locking assembly of the box as shown in FIG. 26.
Figure 30:
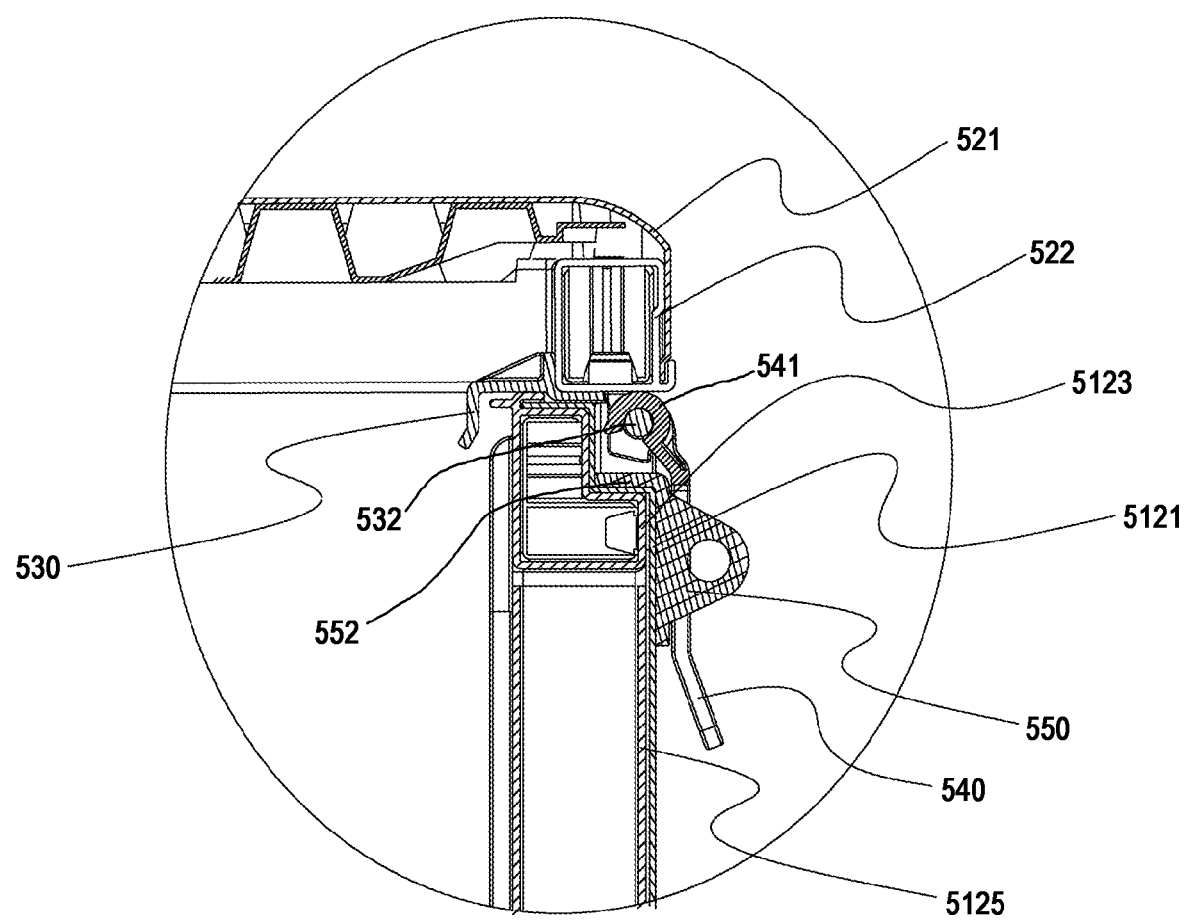
FIG. 30 is a sectional view of the box as shown in FIG. 26 with the box lid is closed on the box body.
Figure 31:
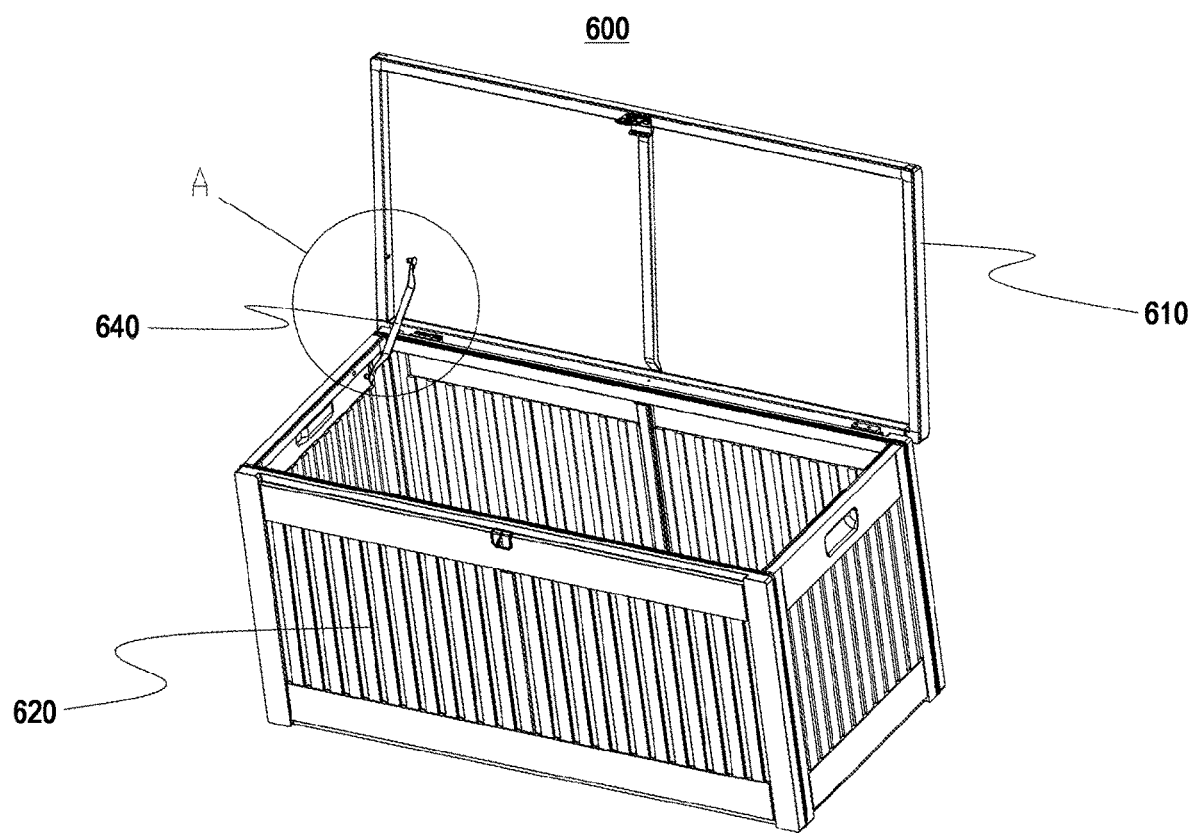
FIG. 31 is a perspective view of a box according to a preferred embodiment of the present disclosure, including a foldable limit member for limiting an open angle of a box lid.
Figure 32:
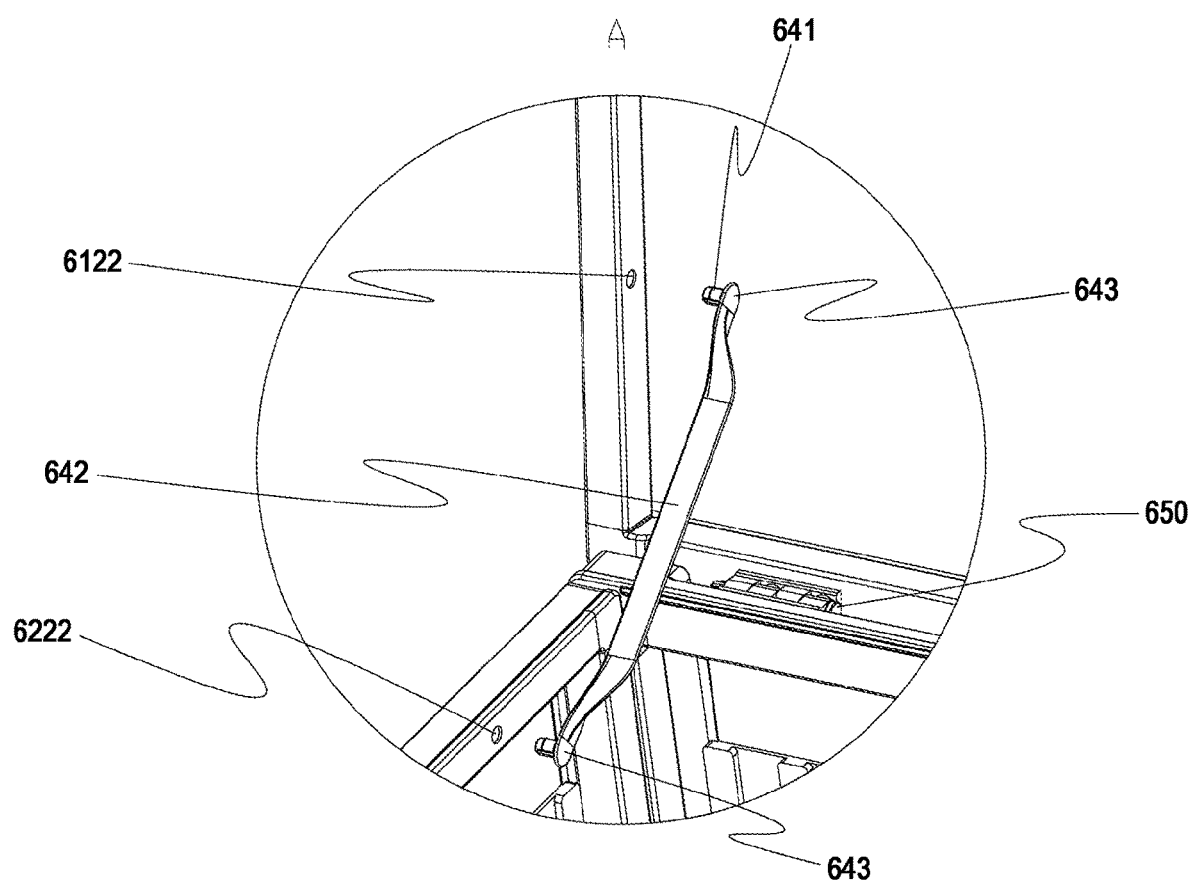
FIG. 32 is an enlarged view of the circle A in FIG. 31.
Figure 33:
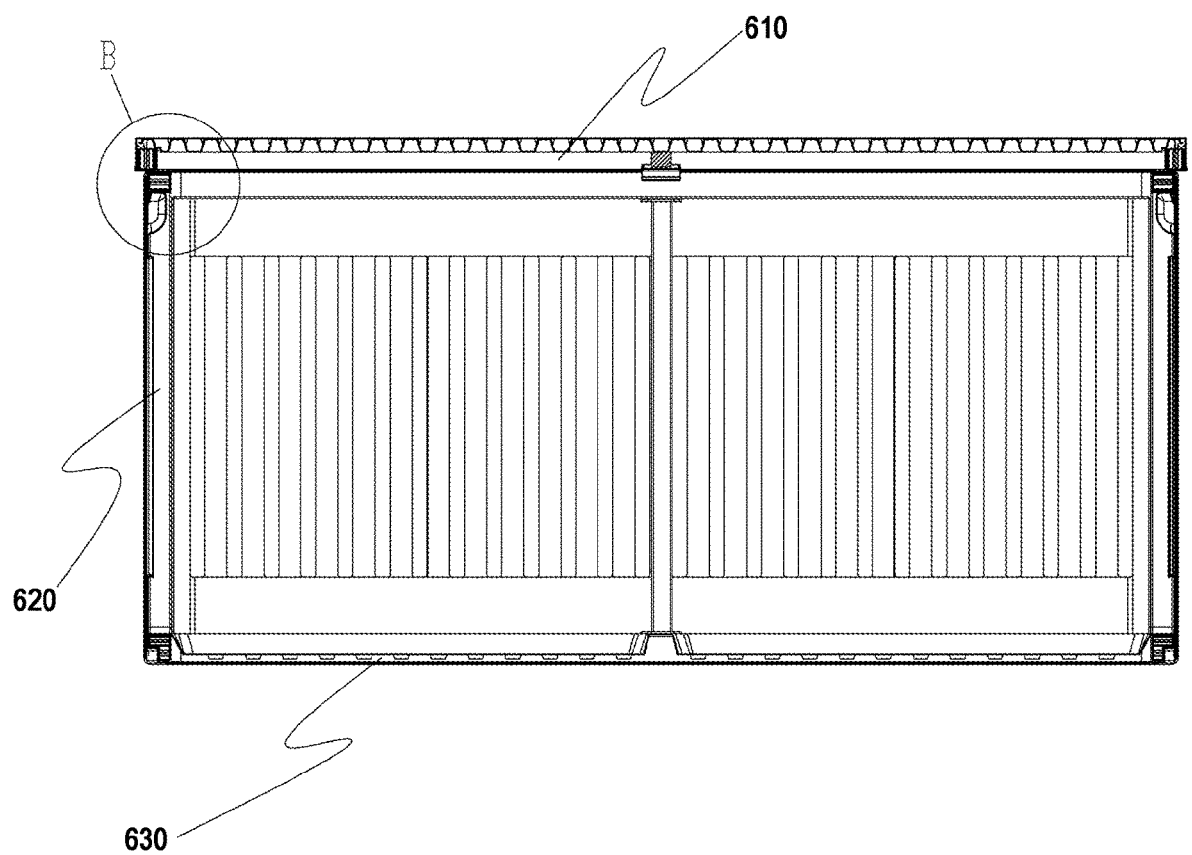
FIG. 33 is a sectional view of the box as shown in FIG. 31.
Figure 34:
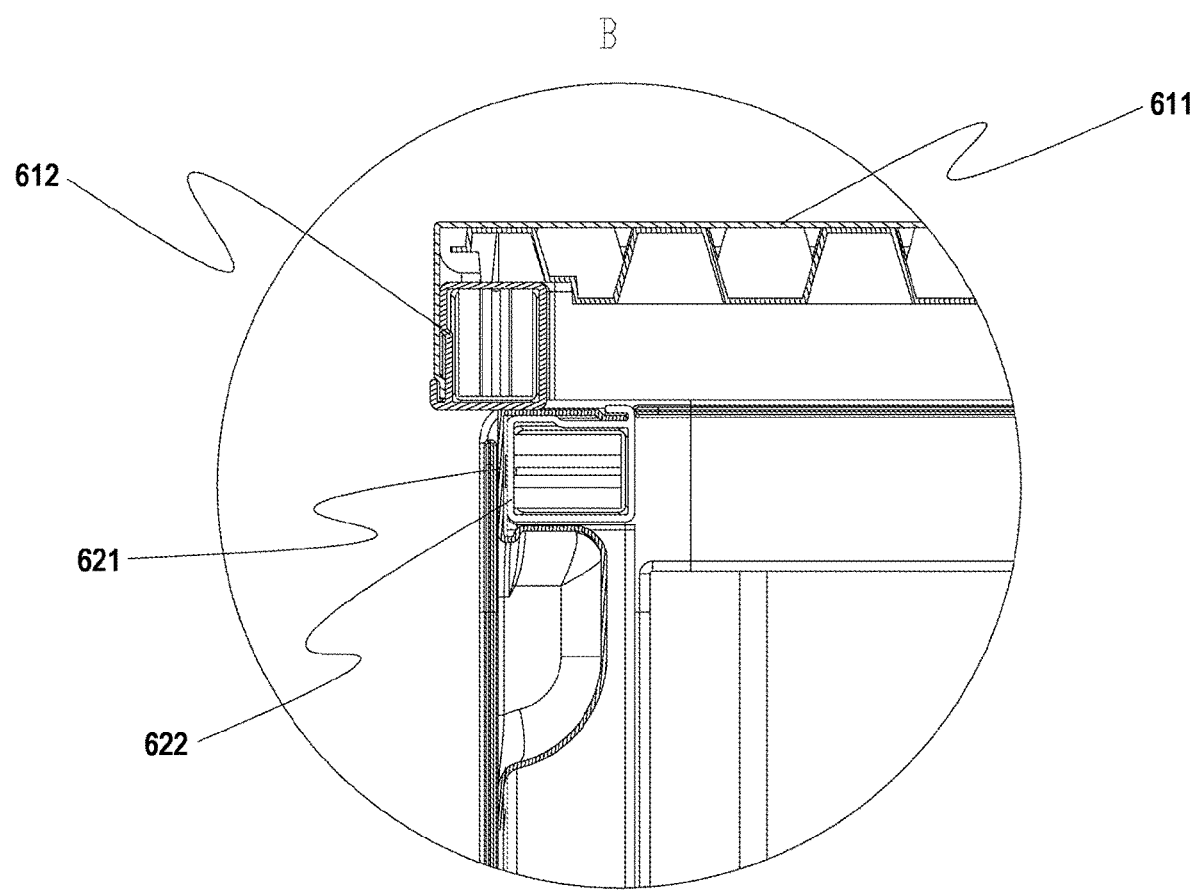
FIG. 34 is an enlarged view of the circle B in FIG. 33.
Figure 35:
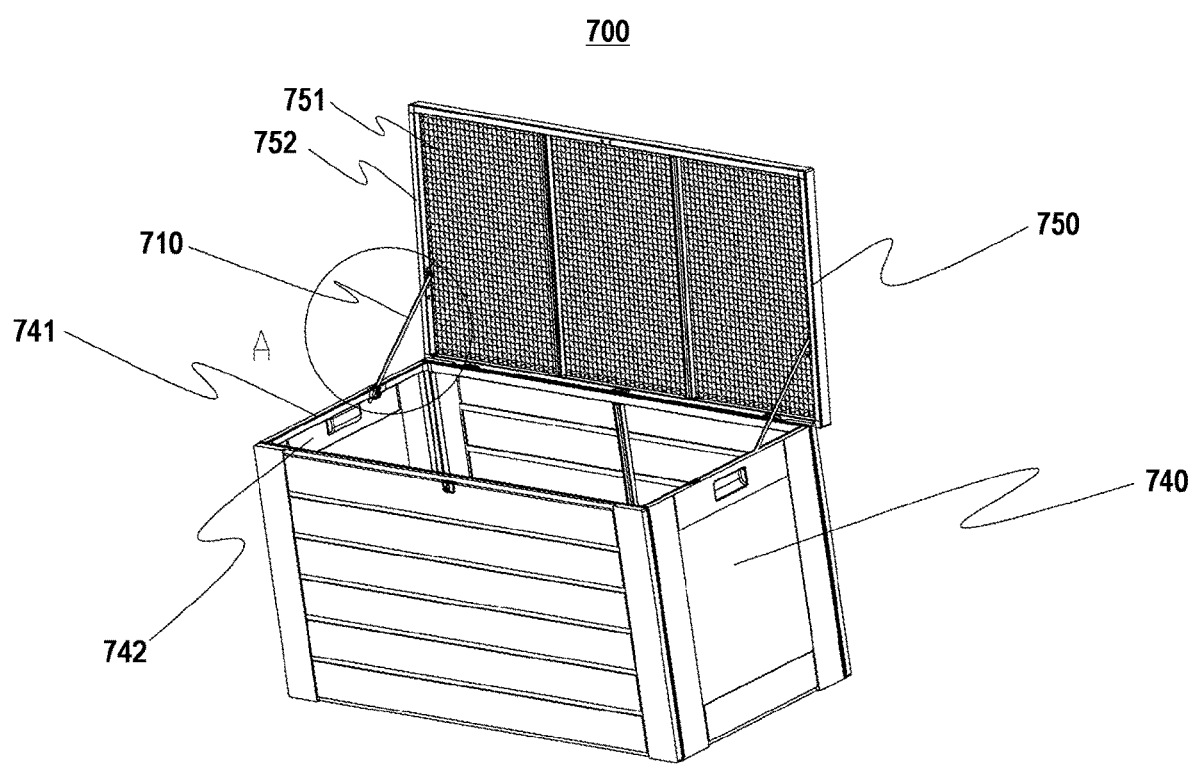
FIG. 35 is a perspective view of a box according to a preferred embodiment of the present disclosure, including a self-positioning assembly configured to position a box lid relative to a box body at any angle.
Figure 36:
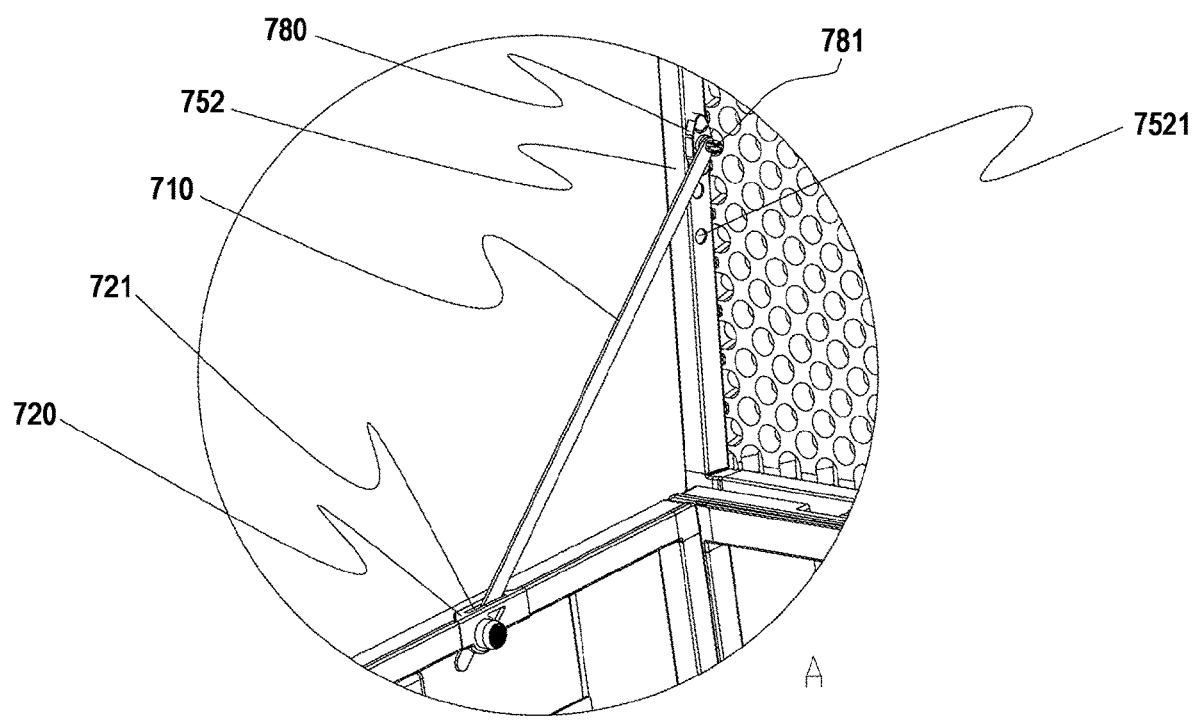
FIG. 36 is an enlarged view of the circle A in FIG. 35.
Figure 37:
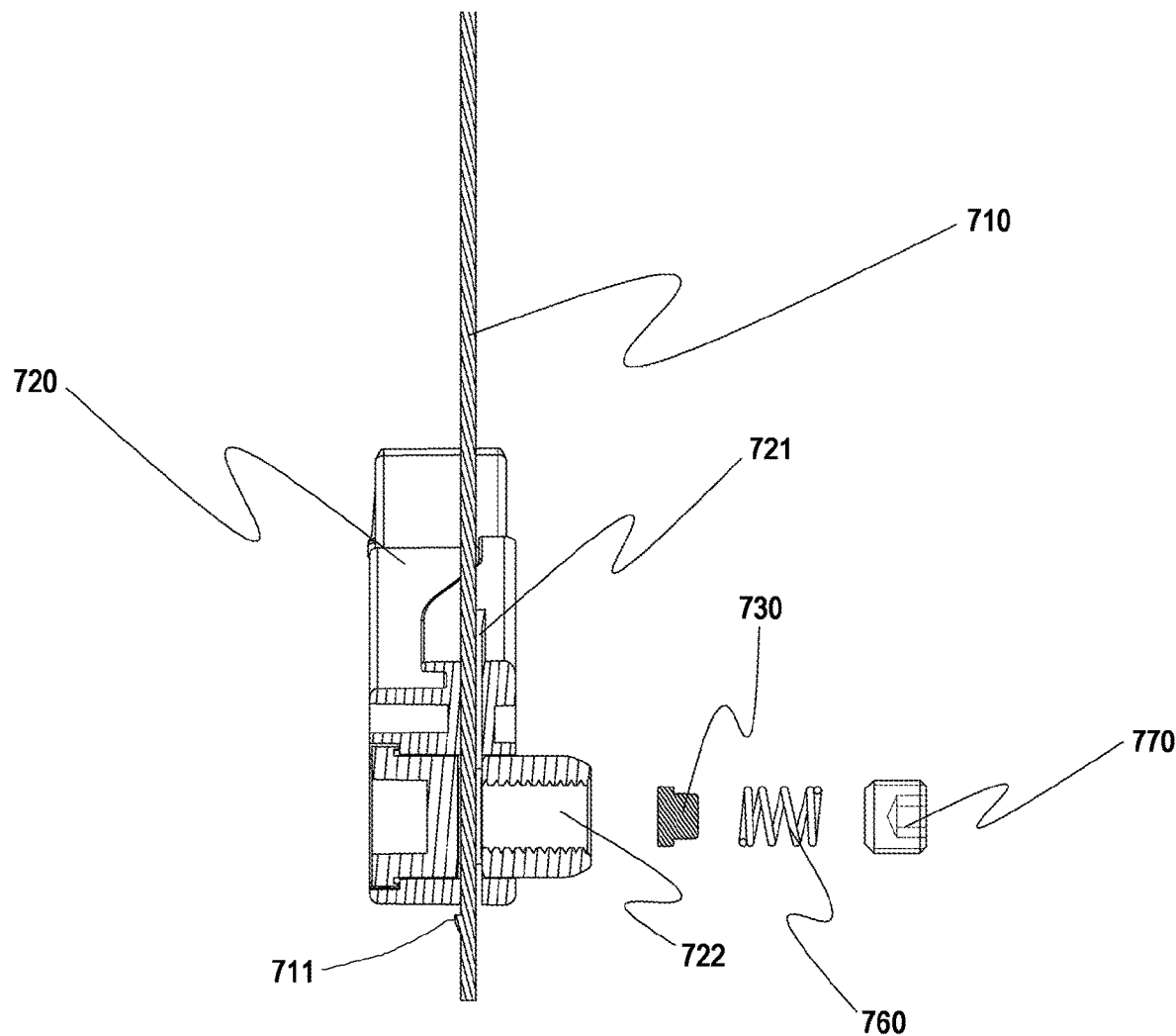
FIG. 37 is a sectional view of the self-positioning assembly as shown in FIG. 35 at a exploded state.
Figure 38:
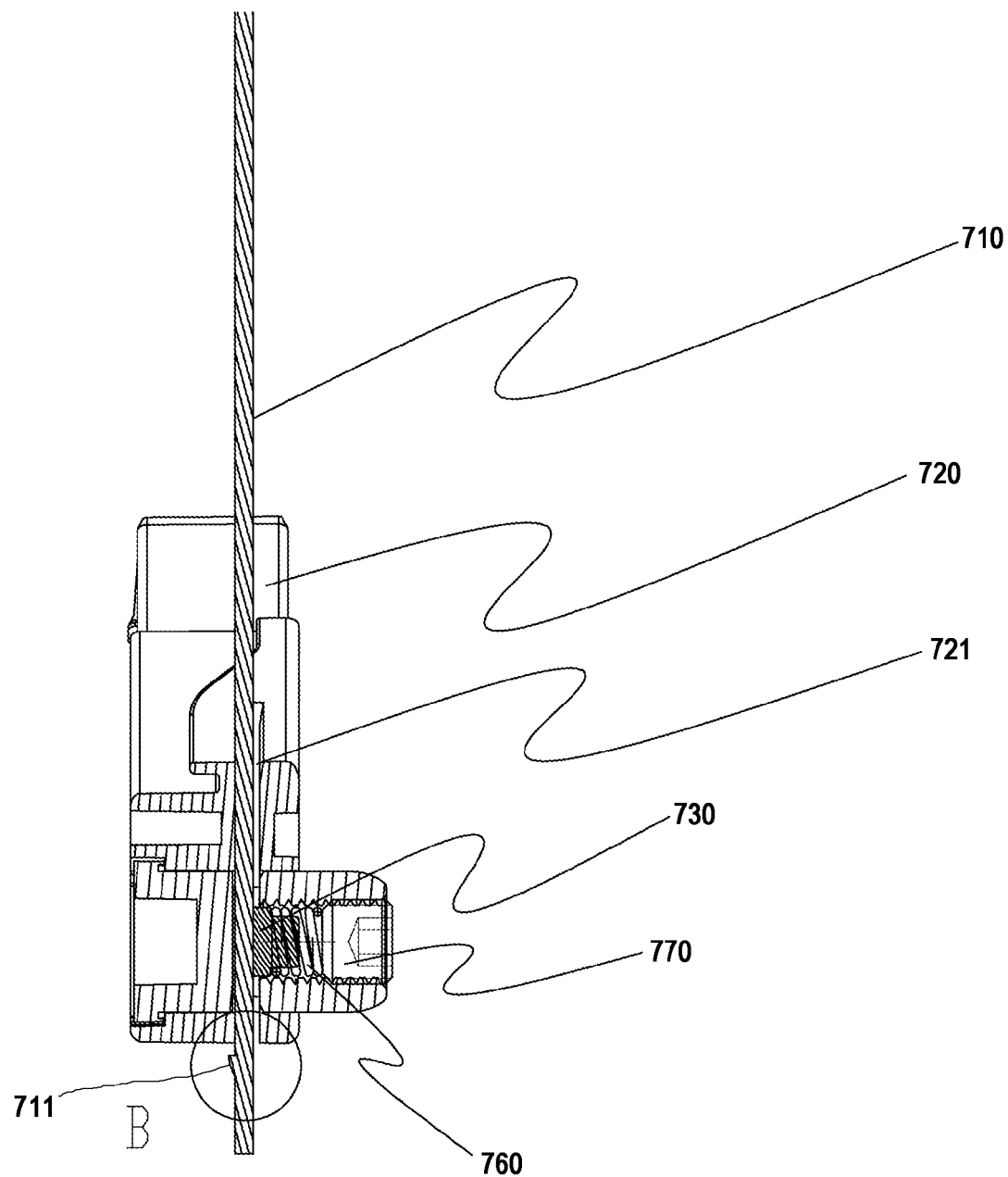
FIG. 38 is a sectional view of the self-positioning assembly as shown in FIG. 35 at an assembled state.
Figure 39:
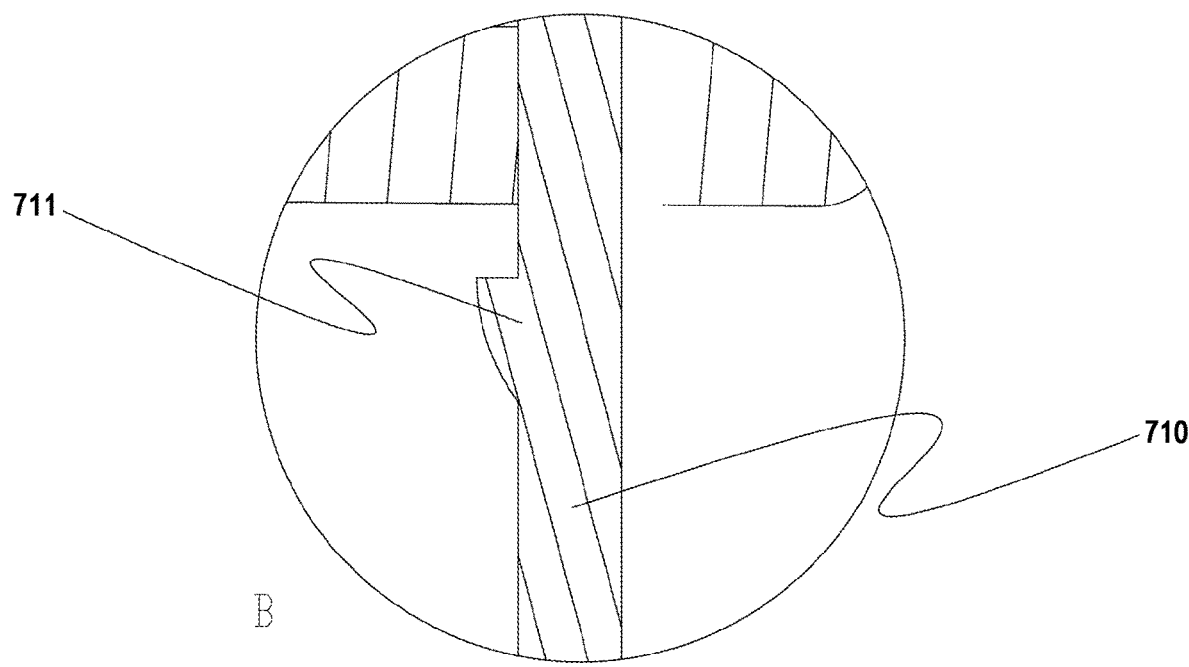
FIG. 39 is an enlarged view of the circle B in FIG. 38.

The single-layer plastic composite board according to the present disclosure has advantages such as a simple structure, small thickness, light weight, high strength, low cost and ease of manufacturing, and thus has a wide application, for example, for assembling furniture, for example, a cabinet, box, table, chair, and the like. FIG. 11 exemplarily illustrates a box 100 assembled from the single-layer plastic composite board according to the present disclosure, where the single-layer plastic composite board is provided with a shape structure imitating woven rattans which can be aesthetically pleasing and reinforce the strength of the plastic sheet. In addition, for the sake of carrying, the texture or pattern on the single-layer plastic composite board is formed with a grasp feature.

FIGS. 12-15 exemplarily illustrate a box 200 assembled from the single-layer plastic composite board according to the present disclosure, including a box lid 210, a floor panel 220 and a plurality of side panels which are spliced together from end to end, where a seam 240 is formed between every two adjacent side panels 230. The side panel 230 includes a panel 231 and a stiffener 232 connected with each other. The stiffener 232 is disposed along a peripheral edge of the panel 231. In two side panels 230 adjacent end to end, the stiffener 232 of a side panel 230 is provided with a wing 2321 extending outwards, which has an elongated structure disposed vertically and covers the seam 240 between the two side panels 230 from the outside.

Preferably, the periphery of the panel 231 is bent inwardly to form a bent portion 2311 around the stiffener 232 from the outside, and the stiffener 232 is provided thereon with a flange 2322 that presses against an edge of the bent portion 2311. The bent portion 2311 of the panel 231 is pressed via the flange 2322 on the stiffener 232 such that the panel 231 abuts against the stiffener 232 more closely, making the whole structure more compact and stable. The wing 2321 extends downwardly from the lower part of the flange 2322.

Preferably, the box includes four side panels 230 (i.e., a front, a rear, a left and a right panel) enclosed in a rectangular frame structure; the box lid 210 is hinged to the rectangular structure, which is used to cover an upper opening; and the floor panel 220 covers a lower opening of the rectangular frame structure. The front and rear side panels 230 clamp the left and right side panels 230, and stiffeners 232 of the front and rear side panels 230 are provided thereon with the wing 2321 as described above, i.e., the wing 2321 is provided at both sides of the stiffener 232 of the front and rear panels 230.

A box or cabinet including the single-layer plastic composite board according to the present disclosure may further include the following members or components.

Connection Assembly

FIGS. 16-20 exemplarily illustrate a box 300 assembled from the single plastic composite boards according to the present disclosure. The box 300 is of a rectangular hexahedral structure and includes a box lid (not shown), a floor panel 320, and four side panels 330 (including a front, a rear, a left and a right side panel) which are formed of the single-layer plastic composite boards according to the present disclosure. Two adjacent side panels 330 may be detachably engaged with each other. The bottoms of the side panels 330 are each provided with a support platform 331, and the peripheral portion of the floor panel 320 extends horizontally outwards to form positioning edges 321 placed on the respective support platforms 331 of the front, rear, left and right side panels. The box also includes a plurality of floor panel fixing posts 340 that are configured to snap fit into the side panels 330 such that the positioning edges 321 are pressed onto the support platforms 331. The side panels are removable relative to each other, and the floor panel 320 may be removed after removing the floor panel fixing posts 340, thereby enabling convenient assembling and removal.

Preferably, the box lid, the floor panel 320 and the side panels 330 of the box are all plastic boards, and even the floor fixing posts 340 are formed of plastic as well. The positioning edges 321 at the periphery of the floor panel 320 are provided thereon with fixing holes, and the supporting platforms 331 of the side panels 330 are provided thereon with mounting holes corresponding to the fixing holes. The floor panel fixing posts pass through the fixing holes and the mounting holes to be snap fit into the side panels such that the positioning edges of the floor panel are pressed against the support platforms of the side panels.

Preferably, two adjacent side panels are snap fit into each other via a limit post 350 and a limit hole 360 which are disposed at two adjacent side panels 330, respectively. The limit post 350 is disposed on a side panel, which has a thick head 352 at its free end. The limit hole 360 is arranged on the other side panel, which is flared from one end to the other end. The head 352 of the limit post 350 is inserted from the wide end to the narrow end of the limit hole 360.

Preferably, the right and left side panels 330 are clamped between the front and rear side panels 330, the right and left side panel at their sides are provided with the limit posts 350, and the front and rear side panels at their inner edge positions are provided with a limit holes 360 which are flared from top to bottom. During assembling, the limit posts 350 of the right and left side panels are inserted from the respective wide ends of the limit holes 360 of the front and rear side panels 330, and the front and rear side panels 330 move downward, as an effect of gravity, to cause the heads 352 of the limit posts 350 snap fit into the narrow ends of the respective limit holes 360, thereby assembling the right and left side panels and the front and rear side panels together.

Preferably, the side panel 330 includes a frame 332 disposed upright, and a panel 333 the periphery of which covers the frame 332. The upper surface of the bottom edge of the frame 332 forms the support platform 331 of the side panel. Preferably, the panel is a blister plate, and it is provided with a frame 32 to reduce the thickness of the side panel when ensuring the strength thereof, thereby saving the material and making the box light-weighted. The floor panel 320 is directly snap fit with the upper surface of the frame bottom to implement a simple, solid structure. The limit posts and limit holes are all formed on the frame 332.

Preferably, the face panels 333 of the right and left side panels 330 are provided thereon symmetrically with inward grooves 3332, for convenience when carrying the box.

Preferably, the floor panel 320 is a blister plate. Four sides of the floor panel 320 are all folded upwards to form ribs 332, and upper edges of the ribs 332 extend horizontally outwards to form the positioning edges 321. Preferably, the middle portion of the floor panel 320 is formed with a plurality of recesses arranged regularly, causing the support force of the floor panel stronger and the structure more stable.

Hinge Assembly

FIGS. 21-25 exemplarily illustrate a box 400 assembled from the single-layer plastic composite boards according to the present disclosure, in particular including a hinge assembly pivotably connecting the box lid 410 and the box body 420. Preferably, the hinge assembly is formed of plastic, including a first hinge member 411, a second hinge member 421 and a pivot member 430. The first hinge member 411 and the second hinge member 421 are of the same shape and each include a fixing portion 413, 423 for engagement with and fixation to the box lid or box body, and one or more pivot portions 412, 422 extending perpendicularly from the fixing portions 413, 423, which are provided therein with through holes 414, 424 extending in parallel with the fixing portion for receiving pivotably a pivot member 430. When there are multiple pivot portions 412, 422, the pivot portions 412, 422 are spaced apart along the fixing portions 413, 423 and the space between the pivot portions 412, 422 is adapted to receive the respective pivot portion, and the through holes in the pivot portions are coaxial such that the first hinge member 411 and the second hinge member 421 can receive the pivot member 430 in a cooperating manner. Preferably, the first hinge member 411 is mounted fixedly onto a bottom of the rear stiffener of the box lid 410; the second hinge member 421 is mounted fixedly into a recess at the rear side of the top stiffener of the rear side panel of the box body 421. The first and second hinge members 411, 421 are located to align the through hole 414 with the through 424 for receiving the pivot member 430. The pivot member 430 is provided with a flange 432 at its proximal end, and one or more V-shaped cutouts 438 formed at its distal end extending from distal to proximal, such that the distal end of the pivot member 430 is provided with a plurality of resilient arms 434 bendable radially inwards extending from proximal to distal. As such, the pivot member 430 is formed as a one-piece structure which is resistant to crush and invulnerable when assembling and detaching the pivot member 430. Each resilient arm 434 at its radial outer surface is provided with a protruding portion 436 which is configured to pass through the though holes 414, 424 of the pivot portions when the resilient arm 434 is bent radically inwards, and not to pass through the through holes 414, 424 of the pivot portions when the resilient arm 434 is in a naturally stretched state. In the course of assembling, the flange 432 and the protrusion portion 436 fix cooperatively the first hinge member 411 located on the box lid and the second hinge member 421 located on the box body. In this way, the first hinge member 411 and the second hinge member 421 can be pivoted freely around the pivot member 430.

Preferably, there is one V-shaped cutout 438 and two resilient arms 434.

Preferably, an intersection of the resilient arms 434 is a smooth transition.

Preferably, the pivot member 430 is a one-piece plastic piece, and the protrusion portion 436 includes a distal guiding bevel 4362 and a proximal guiding bevel 4364, to enable convenient assembling and removal of the pivot member 430.

Preferably, the fixing portions 413, 423 are locked with the box lid and the box body, respectively, enabling convenient removal of the box lid and the box body if required.

Preferably, the fixing portion 413 on the box lid 410 is located at an edge at the rear side of the underside of the box lid 410. The fixing portion 423 on the box body 420 is located at the top of the rear side panel of the box body. Preferably, the top surface of the rear side panel at its outer edge is provided with a recess 426 which receives therein the fixing portion 423. Due to the recess 426, the underside of the box lid 410 can be fit with the top surface of the box body 420 when the box lid 410 is closed on the box body 420.

It would be appreciated that the pivotable connection structure between the box body and the box lid is not limited to the plastic material only, nor is it directed to a plastic box only.

Locking Assembly

FIGS. 26-30 exemplarily illustrate a box 500 assembled from the single-layer plastic composite boards according to the present disclosure. The box 500 includes a box body 510 having a rectangular structure and assembled from a floor panel and four side panels (including a front, rear, left and right side panel), and a box lid 520 for covering the opening of the box body, where the box lid 520 at its rear end is hinged to an upper edge of the rear side panel 511 of the box body 510. The box body 500 also includes a locking assembly configured to reinforce the flexural strength of the front side panel 512 of the box 510, where the locking assembly includes: a first locking member 530 fixed to the front portion of the box lid; a second locking member 550 fixed to the front side panel of the box body; and a third locking member 540 that can be mounted pivotably to the first locking member 530.

Preferably, the first locking member 530 is inserted via snap-fit means at its top into the bottom of the front stiffener 522 of the box lid 520 to form an inverted U shape as a whole. When the box lid is closed, the top stiffener 5123 of the front side panel 512 of the box body can be received at least partly into a recess of the inverted U shape, thereby improving the flexural strength of the front side panel 512 of the box body.

Preferably, the first locking member 530 at its front is provided with a horizontal connecting rod 532, and the third locking member 540 at its top is provided with a hook 541 that can be hooked onto the connecting rod 532 and rotate around it in a certain range.

Preferably, the second locking member 550 is inserted via snap-fit means 551 disposed at its rear side into the front side of the top stiffener 5123 of the front side panel 512 of the box body. The top of the second locking member 550 is bent rearwards to form a horizontal bent portion 552 located in a step portion 5127 disposed at the top of the front side panel 512 of the box body. When the box lid is closed, the second locking member 550 and the third locking member 540 can be latched or locked together.

Preferably, the box lid 520 is provided therein with a stiffener rod 523 for reinforcing the strength of the box lid, which divides the box lid 520 into a left and a right portion.

Preferably, the front side panel 512 of the box body 510 is provided therein with a stiffener rod 5125 for improving the strength of the front panel, which is disposed upright to divide the front side panel 512 into a left and a right portion.

Preferably, the locking assembly is formed of plastic.

Foldable Limit Member

FIGS. 31-34 exemplarily illustrate a box 600 assembled from the single-layer plastic composite boards according to the present disclosure, where a box lid 610 and a box body of the box are hinged together, and the box body is assembled from four side panels 620 and a floor panel 630. The box 600 further includes a foldable limit member 640 for limiting an open angle of the box lid 610 relative to the box body. The foldable limit member 640 is a bendable elongated rod-like member which is provided with a lateral protruding portion 641 at two ends, respectively. A first receiving hole 6122 is provided on a side stiffener 612 of the box lid 610 in a certain distance from the pivot portion 640 of the box body, and a second receiving hole 6222 is provided on a top stiffener 622 of the side panel 620 at the same side as the first receiving hole 6122 in a certain distance from a pivot portion 650 of the box body. The lateral protruding portions 641 at the two ends of the foldable limit member 640 are pivotably inserted into the first receiving hole 6122 and the second receiving hole 6222. After opening the box lid 610, the foldable limit member 640 is stretched straight, and connecting lines among three points formed by projecting the first receiving hole 6122, the second receiving hole 6222, and the pivot portion 650 onto a plane form an obtuse triangle. In other words, the length of the foldable limit member 640 enables the box lid 610 to flip more than 90 degrees but less than 180 degrees relative to the box body. In this way, after the box lid 610 is opened, the box lid 610 can be retained at the opened position due to its gravity and a pulling force of the foldable limit member.

Preferably, the foldable limit member 640 has a three-section structure, including a resilient body portion 642 in the middle having a flat strip shape suitable for bending, and connection ends 643 at two ends, which are flat ends. The resilient body portion 642 and the connection ends 643 are perpendicular to each other, two lateral protruding portions 641 are disposed at the two connection ends 643, respectively, and the lateral protruding portions 641 and the resilient body portion 642 are located at opposite lateral sides of the respective connection ends 634, i.e., the foldable limit member 640 is of a bow shape as a whole.

Preferably, the foldable limit member 640 is formed as one piece from PE or HDPE or PP.

Preferably, the foldable limit member 640 is located at the inner side of the box such that it is disposed inside the box when the box lid 610 is closed. In this way, the box has a neat appearance to prevent the foldable limit member 640 from hooking over other articles when carrying the box.

Self-Positioning Assembly

FIGS. 35-39 exemplarily illustrates a box 700 assembled from the single-layer plastic composite boards according to the embodiments of the present disclosure, where a box lid 750 and a box body are hinged pivotably together, and the box body is assembled from side panels 740 and a floor panel. The box 700 includes a self-positioning assembly for arbitrarily fixing the box lid 750 in a certain angle range relative to the box body when opened, which includes:

a holder 720 fixed onto top stiffeners 742 of a left side panel 740 and/or a right side panel 740 of the box body, which is provided therein with a chute 721 extending along the vertical direction through the top and the bottom surfaces of the holder, and a retaining hole 722 extending horizontally to communicate with the chute 721 and through a side surface of the holder facing the inside of the box body;

a support rod 710 having an end hinged with a respective side stiffener 752 of the box lid 720 and an opposite end extending through the chute 721, where the width of the chute 721 is greater than that of the support rod 710, such that the support rod 710 can slide vertically and swing back and forth in the chute 721; and a fastening assembly disposed in the retaining hole 722 for applying a pressure to the support rod 710, where a frictional force against the support rod 710 caused by the pressure can overcome the gravity of the box lid 750 to thus hold the box lid at the opened position; when the frictional force is overcome, the support rod 710 may be slide vertically and swing back and forth in the chute 721; and the magnitude of the pressure can be adjusted by the fastening assembly.

Preferably, the retaining hole 722 at its inner surface is provided with an internal thread, and the fastening assembly includes:

a compression block 730 disposed in the retaining hole 722 and movable along the same;

a bolt 770 having an external thread configured to match with the internal thread of the retaining hole 722;

a resilient piece 760 disposed in the retaining hole 722 between the compression block 730 and the bolt 770 for applying a resilient force to the compression block 730. The bolt 770 may be screwed to adjust the pressure applied by the resilient piece 760 to the compression block 730, and in turn adjust the frictional force between the compression block 730 and the support rod 710.

Preferably, the resilient piece 760 is a compression spring, the compression block 730 is provided with a boss thereon, and the compression spring is nested at one end onto the boss and abuts at the other end against the end of the bolt.

Preferably, at the end passing through the chute 721, the support rod 710 is provided with a stopper 711 for preventing the support rod 710 from sliding out of the chute 721, and the stopper 711 is designed not to pass through the chute 721.

Preferably, the stopper 711 is a hook.

Preferably, the self-positioning assembly also includes a hinge base 780 which is connected onto the side stiffener 752 of the box lid 750, and the support rod 710 at an end is pivotably hinged to the hinge base 780.

Preferably, the hinge base 780 is provided with a positioning pin 781, and the side stiffener 752 of the box lid 750 is provided thereon with a plurality of positioning holes 7521 for receiving the positioning pin 781. The positioning pin 781 is plugged in one of the positioning holes 7521. Given that there is a plurality of positioning holes 7521, a maximum open angle of the box lid 750 may be preset by plugging the positioning pin 781 into a selected position hole 7521.

Preferably, the top stiffeners 742 of the left and/or right side panel 740 of the box body are provided thereon with a locking groove in which the holder 720 can be mounted.

Preferably, when the box lid 750 is closed, the self-positioning assembly is located in a receiving space formed by the box body and the box lid, to obtain a neater appearance of the box body and thus prevent the support rod 710 from hooking over other surrounding articles.

Preferably, the support rod 710, the holder 720 and the hinge base 780 are all formed of plastics.

The protection scope of the present disclosure is defined by the claims. Given the teaching of the present disclosure, those skilled in the art would readily envision employing substitutes of the structures disclosed herein as feasible substitute embodiments, and combining the embodiments as disclosed herein to form new embodiments, which are all fall within the scope defined by the appended claims.

I claim:

1. A single-layer board comprising:
a single-layer plastic sheet having a flat main body portion and a peripheral portion perpendicular to the main body portion; and
a tubular stiffener fixed directly to at least a part of the peripheral portion, the tubular stiffener having a first section parallel with and abutting against the main body portion and a second section perpendicular to the first section, the second section having a flange extending perpendicular to the second section, and the second section abutting against the peripheral portion and the flange engaged with an end of the peripheral portion.

2. The single-layer board of claim 1, wherein the tubular stiffener further comprises a third section between the first section and the second section such that the first section, the second section and the third section jointly form a stepped shape.

3. The single-layer board of claim 2 wherein the peripheral portion has a stepped shape matching the stepped shape of the tubular stiffener.

4. The single-layer board of claim 1 wherein the tubular stiffener has a shape which is complementary to the shape of the peripheral portion.

5. The single-layer board of claim 1 further including a printed pattern on a front surface of the main body portion.

6. The single-layer board of claim 1 wherein the main body portion has a concave-convex configuration.

7. The single-layer board of claim 6 wherein the concave-convex configuration comprises a grid to reinforce the single-layer plastic sheet.

8. The single-layer board of claim 1 wherein the single layer plastic sheet includes a grasp element.

9. The single-layer board of claim 1 further including a flange on one side of the tubular stiffener and a wing extending from the flange.

10. The board of claim 1 wherein the main body portion directly adjoins an entire top surface of the first section of the tubular stiffener and the peripheral portion directly adjoins the second section of the tubular stiffener.

11. The board of claim 1 wherein the peripheral portion is in direct contact with the flange.

12. The board of claim 1 wherein the flange is integral with a bottom surface of the tubular stiffener.

13. The single-layer board of claim 1 wherein the main body portion directly adjoins and entirely overlies the first section and the peripheral portion adjoins the second section of the tubular stiffener.

14. A single-layer board, comprising:
a single-layer plastic sheet having a planar main body portion and a peripheral portion at a periphery of the main body portion, the peripheral portion perpendicular to the main body portion; and
a metal stiffener attached to the peripheral portion, the metal stiffener comprising a bent or rolled metal sheet, the metal stiffener having a first section including an inner layer and an outer layer longer than the inner layer, and a second section perpendicular to the first section, the outer layer having an end portion spaced apart from and parallel with the second section, the end portion extending partially along the second section, a lower end of the peripheral portion in a gap between the end portion and the second section.

15. The single-layer board of claim 14, wherein the metal stiffener further comprises a third section that extends from an end of the second section along a direction perpendicular to the second section and abuts against the main body portion.

16. The single-layer board of claim 14, wherein the metal stiffener and the single-layer plastic sheet are fixed to each other via an adhesive.

17. A board, comprising:
a single layer plastic sheet having a main body and a peripheral portion perpendicular to the main body;
a tubular stiffener attached to at least a part of the peripheral portion, the tubular stiffener comprising a first wall parallel with the main body and a second wall perpendicular to the first wall and parallel to the peripheral portion, the main body directly adjoining and entirely overlying the first wall, the peripheral portion directly adjoining the second wall; and
an upper end of the second wall joined to an end of the first wall, and a flange projecting outward from the second wall, the second wall abutting an inner surface of the peripheral portion, and a lower end of the peripheral portion abutting the flange.

18. The board of claim 17 wherein the peripheral portion is in direct contact with the flange.

19. The board of claim 17 wherein the flange is integral with a bottom surface of the tubular stiffener.

20. The board of claim 17 wherein the first wall abuts against the main body.

* * * * *